United States Patent
Nakagawa et al.

(10) Patent No.: US 12,218,503 B2
(45) Date of Patent: Feb. 4, 2025

(54) ENERGY SYSTEM AND ENERGY TRANSFER ADJUSTMENT METHOD

(71) Applicant: NATIONAL UNIVERSITY CORPORATION TOKAI NATIONAL HIGHER EDUCATION AND RESEARCH SYSTEM, Nagoya (JP)

(72) Inventors: Tsuguhiko Nakagawa, Gifu (JP); Hideyuki Chisaka, Gifu (JP)

(73) Assignee: NATIONAL UNIVERSITY CORPORATION TOKAI NATIONAL HIGHER EDUCATION AND RESEARCH SYSTEM, Nagoya (JP)

( * ) Notice: Subject to any disclaimer, the term of this patent is extended or adjusted under 35 U.S.C. 154(b) by 351 days.

(21) Appl. No.: 17/776,106

(22) PCT Filed: Nov. 27, 2020

(86) PCT No.: PCT/JP2020/044184
§ 371 (c)(1),
(2) Date: May 11, 2022

(87) PCT Pub. No.: WO2021/111997
PCT Pub. Date: Jun. 10, 2021

(65) Prior Publication Data
US 2022/0393470 A1    Dec. 8, 2022

(30) Foreign Application Priority Data
Dec. 2, 2019   (JP) .................................. 2019-217883

(51) Int. Cl.
*H02J 3/32*    (2006.01)
*B60L 55/00*   (2019.01)
(Continued)

(52) U.S. Cl.
CPC ................ *H02J 3/32* (2013.01); *B60L 55/00* (2019.02); *F28D 20/00* (2013.01); *H02J 3/003* (2020.01);
(Continued)

(58) Field of Classification Search
CPC .. B60L 55/00; F28D 20/00; F28D 2020/0086; H02J 3/003; H02J 3/004;
(Continued)

(56) References Cited

U.S. PATENT DOCUMENTS

2022/0135019 A1* 5/2022 Kigure .................... B60L 58/12
                                                                        701/22
2023/0133117 A1* 5/2023 Kudo ...................... H02J 3/144
                                                                        700/295

FOREIGN PATENT DOCUMENTS

JP    2007-159225 A    6/2007
JP    2011-142779 A    7/2011
(Continued)

OTHER PUBLICATIONS

EU Search Report Issued on Jan. 24, 2024 for EP 0896860.2, Which Corresponds to the Current U.S. Appl. No. 17/776,106.
EU Search Report Issued on Jan. 26, 2024 for U.S. Appl. No. 17/776,106, Which Corresponds to the Current U.S. Appl. No. 17/776,106 (Previously Submitted ids Had a Wrong Date and EP No.).

*Primary Examiner* — Levi Gannon
(74) *Attorney, Agent, or Firm* — Yoshida & Associates LLC; Ken I Yoshida

(57) ABSTRACT

In an energy system in a community provided with a plurality of unit grids, each of which is an energy transfer network of a single-unit facility including a power load, the unit grids each include a photovoltaic generator, supply power generated by the photovoltaic generator thereof to the power load thereof, and, as an electric vehicle moves, form a cooperative grid that transfers power stored in a mobile storage battery mounted on the electric vehicle to and from
(Continued)

another of the unit grids, and some of the unit grids whose geographical positional relationship is not fixed form a virtual grid for transferring power as a combination of the unit grids that form the cooperative grids changes in accordance with a destination of the electric vehicle.

12 Claims, 16 Drawing Sheets

(51) Int. Cl.
  *F28D 20/00* (2006.01)
  *H02J 3/00* (2006.01)
  *H02J 3/38* (2006.01)
(52) U.S. Cl.
  CPC .............. *H02J 3/004* (2020.01); *H02J 3/322* (2020.01); *H02J 3/381* (2013.01); *F28D 2020/0086* (2013.01); *H02J 2300/24* (2020.01)

(58) Field of Classification Search
  CPC ...... H02J 3/28; H02J 3/32; H02J 3/322; H02J 3/381; H02J 7/34; H02J 7/35; H02J 2300/24
  See application file for complete search history.

(56) References Cited

FOREIGN PATENT DOCUMENTS

| | | | |
|---|---|---|---|
| JP | 2012-191736 A | 10/2012 | |
| JP | 2012-200065 A | 10/2012 | |
| JP | 2014-204527 A | 10/2014 | |
| JP | 2018-157615 A | 10/2018 | |
| WO | WO-2020/167306 A1 * | 8/2020 | .............. H02J 3/322 |

* cited by examiner

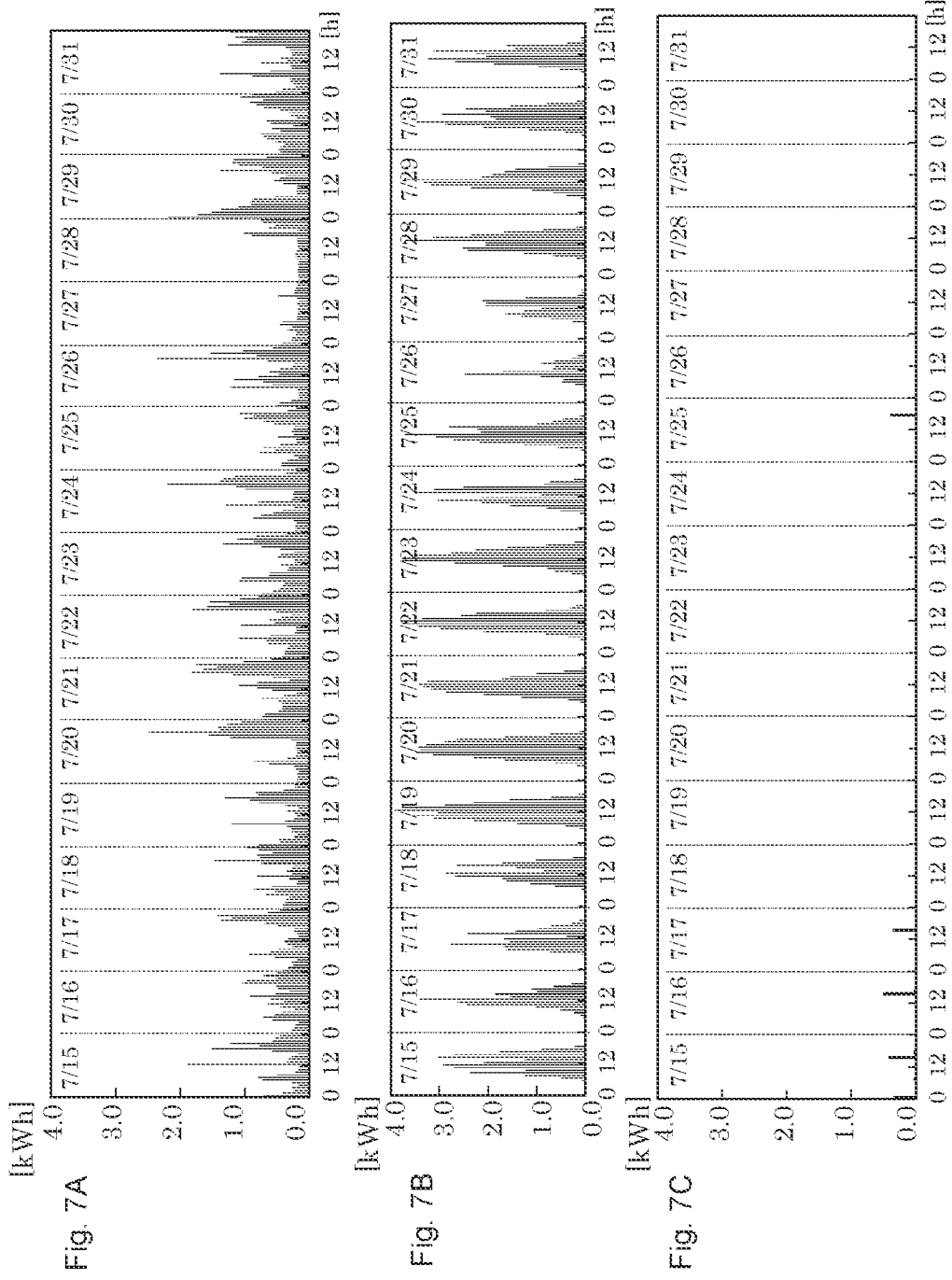

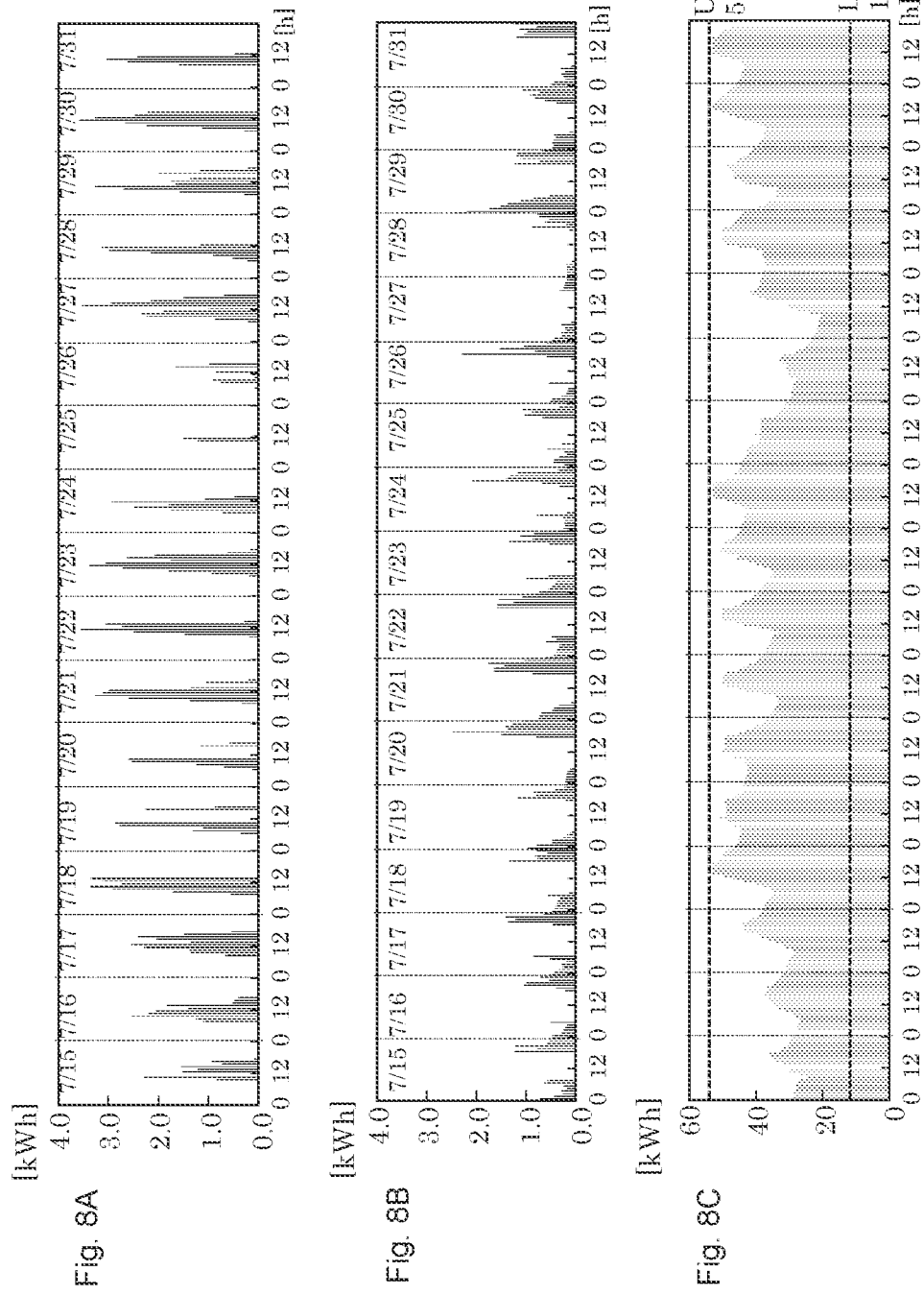

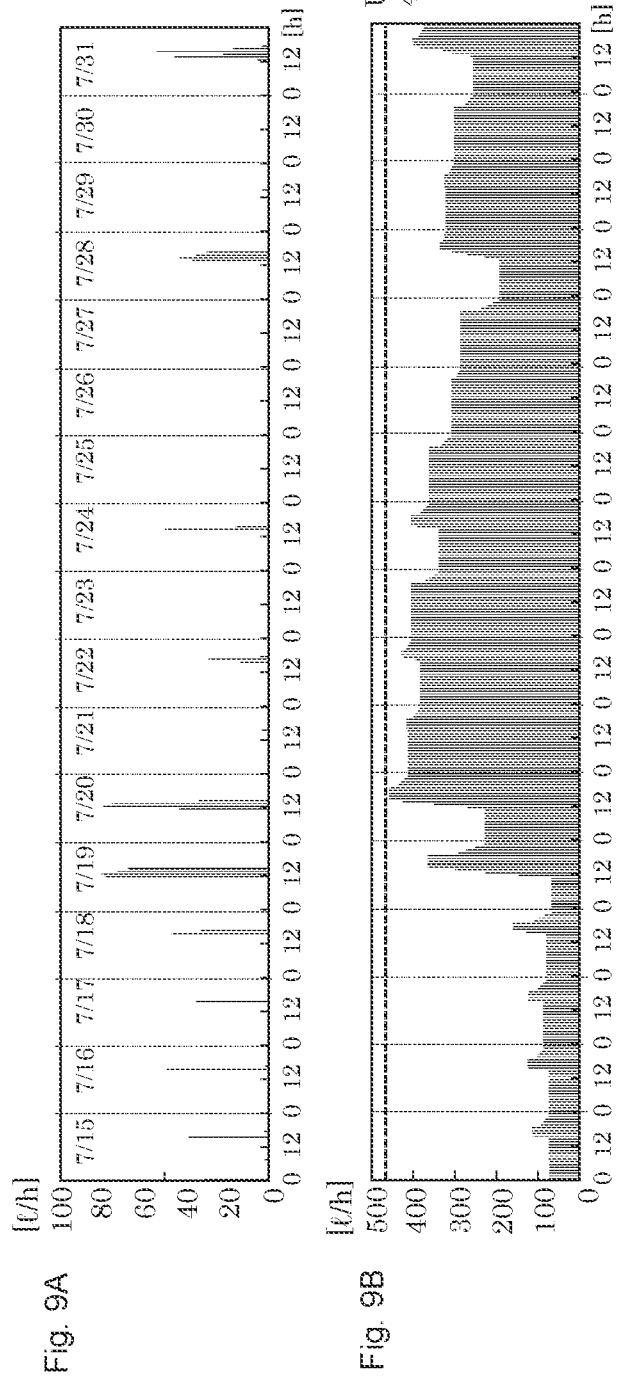

Fig. 10A  PSCESL-1: Power supplied through conventional electric system line (House)
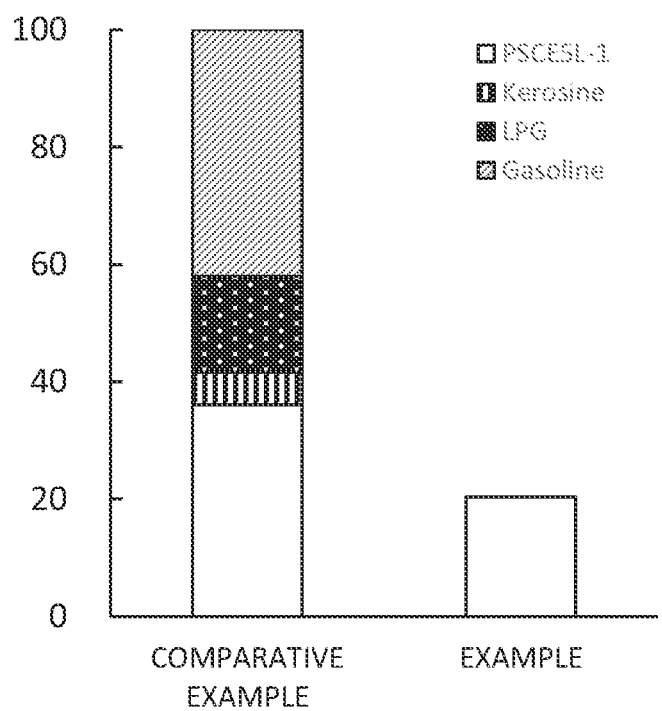
Fig. 10B  PSCESL-1: Power supplied through conventional electric system line (House)
PSCESL-2: Power supplied through conventional electric system line (Workplace)
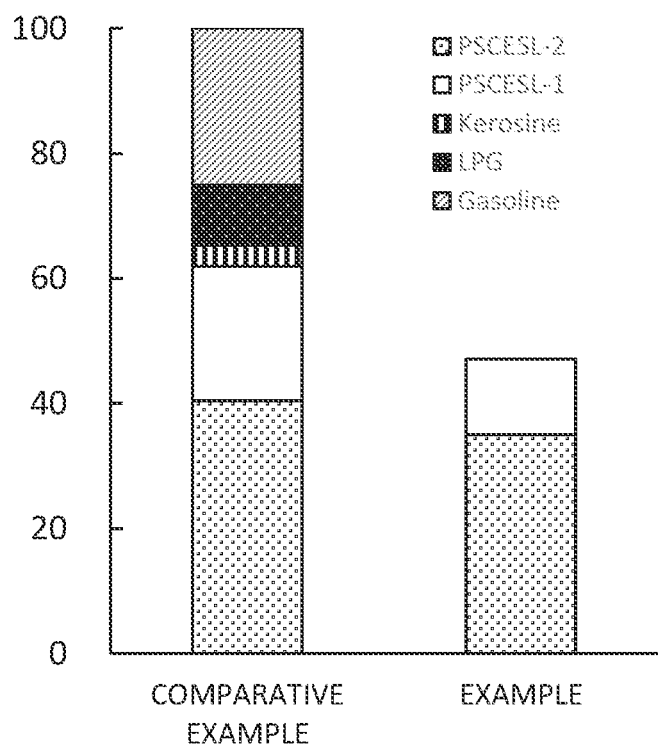

ENERGY SYSTEM AND ENERGY TRANSFER ADJUSTMENT METHOD

BACKGROUND OF THE INVENTION

Field of the Invention

The present invention relates to an energy system and an energy transfer adjustment method used in the energy system.

Description of the Related Art

Conventional electrical energy systems are unidirectional systems in which power (power supplied through a conventional electric power system line) transferred (transmitted), through a power line, from a large power plant that generates power using fossil fuels is supplied to power consumers in accordance with the amount of consumption. In such the conventional systems, the longer a transfer distance is, the larger the power losses become. Therefore, the amount of power to be supplied is large in relation to the amount of power needed by the power consumers in an end, and accordingly $CO_2$ gas emissions are large. Reducing emission of $CO_2$ gas, which is a main cause of global warming, is an urgent issue for mankind, but in order to reduce $CO_2$ gas emissions with conventional systems, a supplier side and a consumer side need to implement individual measures, and such measures are not sufficiently taken in reality.

During these years, on the other hand, local production-local consumption, decentralized and autonomous small-scale power networks have been proposed in which consumption of power supplied through the conventional electric power system line is reduced by installing relatively small-scale power supply sources in limited areas near power consumers and supplying power to the power consumers from these sources. Because distances between the power supply sources and the power consumers are small in such small-scale power networks, power losses over the distances are small is advantageous. In addition, use of power generators employing renewable energy as power supply sources in the small-scale power networks has been proposed. In this case, $CO_2$ gas emissions are expected to be reduced. In addition, for Japan, which relies on imports for most of fossil fuels, use of renewable energy, which is permanently not depleted and can be procured domestically, is important in ensuring stable supply of energy.

It is inevitable, however, that the amount of power generated through power generation employing renewable energy, such as photovoltaic power generation, solar thermal power generation, or wind power generation, significantly fluctuates depending on various conditions in a natural world such as weather conditions. For this reason, conventional energy systems incorporating power generators that employ renewable energy use large-capacity stationary storage batteries (secondary batteries) in order to balance the amount of power generated and demand (for example, see Patent Document 1: Japanese Patent Application Laid-open No. 2007-159225). Large-capacity stationary storage batteries, however, are expensive and require a large amount of space for installation.

Patent Document 1: Japanese Patent Application Laid-open No. 2007-159225

SUMMARY OF THE INVENTION

In view of the above circumstances, the present invention aims to provide an energy system capable of reducing dependence upon the conventional electric power system and a need for large-capacity stationary storage batteries by effectively using renewable energy and an energy transfer adjustment method used in the energy system.

In order to solve the above problem, the energy system in the present invention is:

"an energy system in a community provided with a plurality of unit grids, wherein each of the unit grids is an energy transfer network of a single-unit facility including a power load that consume power, wherein each of the unit grids include a renewable energy power generator that generates power using renewable energy and supply the power generated by the renewable energy power generator thereof to the power load thereof, wherein each of the unit grids forms, as an electric vehicle moves, a cooperative grid that transfers power stored in a mobile storage battery, which is a storage battery mounted on the electric vehicle, to and from another of the unit grids, and wherein some of the unit grids whose geographical positional relationship is not fixed form a virtual grid for transferring power as a combination of the unit grids that form the cooperative grids changes in accordance with a destination of the electric vehicle".

In conventional energy systems, a network is formed in which power consumers who receive power supply are connected to an electric power supply source through conventional electric power system lines and power is unidirectionally transferred to the power consumers from the electric power supply source. Such a conventional network is based on an area, that is, an energy transfer relationship is fixed. In the energy system in the present invention, on the other hand, an energy transfer relationship is not fixed, and a combination that energy is transferred variously changes as an electric vehicle moves, details of which will be described later.

The community in which energy is transferred in the energy system in the present invention is formed by a plurality of "unit grids", each of which is an energy transfer network at a single-unit facility that includes a power load. Each of the unit grids includes a renewable energy power generator that generates power using renewable energy, and such unit grids form a cooperative grid that transfer energy to and from each other through electric vehicles. That is, in a society where there are facilities each of which includes a renewable energy power generator and facilities each of which does not include a renewable energy power generator, and both electric vehicles and non-electric vehicles run, only the facilities each of which includes the renewable energy power generator establish energy transfer relationships through electric vehicles.

The electric vehicles that move between the unit grids can be considered as storage batteries for the entirety of the community. The electric vehicles do not run for the purpose of transferring energy but transfers energy "while" achieving an original purpose of movement, such as transportation of people or transportation of objects (logistics). That is, the energy system is a system that integrates transportation of people or objects with transfer of energy. Combinations of unit grids that form cooperative grids variously and flexibly change in accordance with destinations (purposes of movement) of the electric vehicles. Grids for transferring power whose connections are not visible like conventional power lines but change from time to time and the grids formed by a plurality of unit grids whose geographical positional relationships are not fixed are the grids of a completely new concept. In the present invention, such grids will be referred to as "virtual grids". "Another unit grid" that forms cooperative grids with a certain unit grid may be a plurality of unit grids.

Unlike conventional energy systems, this energy system ultimately does not require conventional power lines. There are, therefore, no geographical restrictions, and there is no need to invest in equipment all at once to build the system. That is, in the current society where there are facilities each of which includes a renewable energy power generator and facilities each of which do not include a renewable energy power generator and both electric vehicles and non-electric vehicles run, a scope of the energy system will gradually expand as facilities each of which includes the renewable energy power generator increase and electric vehicles gradually replace non-electric vehicles.

By transferring power generated by the renewable energy power generators to the electric vehicles and sharing the power between the unit grids, renewable energy can be effectively used, and the dependence upon the conventional electric power system can be reduced. In addition, in the energy system, the mobile storage batteries that are originally mounted on electric vehicles in order to store power for driving are also used as storage batteries for transferring energy between the unit grids. As a result, a need for large-capacity stationary storage batteries, which have been conventionally considered essential when renewable energy power generators, with which the amount of power generated inevitably significantly fluctuates depending on various conditions in a natural world such as weather conditions, are used, can be reduced.

"Renewable energy" used by the renewable energy power generators to generate power may be, for example, sunlight, solar heat, wind power, terrestrial heat, or ocean energy.

A "facility" that uses a unit grid as an energy transfer network thereof is not particularly limited insofar as the facility includes a renewable energy power generator, and may be, for example, a general house, a company, an office, a school, a public facility, a commercial facility such as a department store or a supermarket, or an industrial facility such as a factory or a distribution warehouse. A large facility such as a factory, a warehouse, or a school might be socially regarded as one facility, but might include a plurality of facilities that is each provided with a renewable energy power generator. In such a case, each of the facilities may be regarded as a unit grid.

An "electric vehicle" is not limited insofar as the vehicle moves by driving an electric motor using power stored in a mobile storage battery mounted thereon, and may be, for example, a home car, a truck, a bus, a train, a ship, a construction or civil engineering vehicle, an on-site crane, an agricultural vehicle, or transport equipment such as a forklift, a self-propelled cart, or a self-propelled pallet. A cooperative grid is formed as at least one electric vehicle moves, but in a facility including a renewable energy power generator, the electric vehicle may be used as means for supplying power generated by the renewable energy power generator to a power load of the facility to which the electric vehicle belongs.

A charge apparatus that charges a mobile storage battery from a renewable energy power generator and a discharge apparatus that discharges a mobile storage battery may each be included in a "facility" or an "electric vehicle".

In addition, a charge and discharge apparatus that single-handedly charges and discharges a mobile storage battery may be included. The charge and discharge apparatus may be included in a facility or an electric vehicle. When there are a plurality of electric vehicles in a facility and a charge and discharge apparatus that charges and discharges a mobile storage battery is included the facility, the facility needs to include a plurality of charge and discharge apparatuses in order to charge or discharge a plurality of mobile storage batteries simultaneously, but the electric vehicles are lightweight and simple, which is advantageous. On the other hand, when the plurality of electric vehicles each include a charge and discharge apparatus, the weight of the electric vehicles accordingly increases and the structure of the electric vehicles becomes more complex, but the plurality of mobile storage batteries can be simultaneously charged or discharged using connectors provided for the facility, which is advantageous.

The energy system in the present invention may be the energy system having the below configuration, "wherein each of the unit grids includes a control apparatus that performs energy transfer adjustment, and wherein the control apparatus controls transfer of power through a current path for performing at least supply of power to the power load, supply of power to the mobile storage battery, or discharge of the mobile storage battery on a basis of detection of numerical data including an amount of power generated by the renewable energy power generator, power demand of the power load, and an amount of power stored in the mobile storage battery".

In this configuration, the control apparatus performs the energy transfer adjustment in each unit grid. When a facility of a certain unit grid includes an electric vehicle, the control apparatus may be included in the facility or the electric vehicle. A configuration in which the facility includes the control apparatus is suitable when the facility includes the charge and discharge apparatus. A configuration in which the electric vehicle includes the control apparatus, on the other hand, is suitable when the electric vehicle includes the charge and discharge apparatus.

In this configuration, at least part of the transfer of power through the current path may be performed through wireless power transmission, in which power is converted into electromagnetic waves and transmitted. By performing at least part of the transfer of power through wireless power transmission, an extent to which power cable is stretched can be reduced, and a configuration for transferring power can be made neat and simple. Especially when noncontact wireless power transmission is performed between the connectors provided for the facility and the mobile storage batteries of the electric vehicles, it becomes easy to perform charging and discharging operations, which is convenient. Here, microwave wireless power transmission, in which power is converted into electromagnetic waves and transmitted, is advantageous among some wireless power transmission methods in that power transmission over a distance range for which the energy system is intended can be performed.

In addition, in this configuration, a sensing device that detects the numerical data may transmit the numerical data to the control apparatus through wireless communication. By performing wireless communication between the sensing device, which detects numerical data including the amount of power generated by the renewable energy power generator, the power demand of the power load, and the amount of power stored in the mobile storage battery, and the control apparatus, an energy system with a simple configuration can be achieved. Here, "wireless communication" may be wireless communication based on a wireless LAN employing Wi-Fi or the like or short-distance wireless communication such as Bluetooth (registered trademark).

The energy system in the present invention may be the energy system having the below configuration, "wherein the control apparatus of each of the plurality of unit grids is connected to a management server over a communication network, wherein each of the control apparatus transmits the numerical data to the management server over the communication network, and wherein the management server includes a database that stores the received numerical data and identification information regarding the unit grid while associating the numerical data and the identification information with each other, and means for extracting a combination of the unit grids that form the cooperative grid for transferring power on a basis of an excess or a shortage of power in each of the unit grids".

In this configuration, cooperative grids for transferring power are formed between unit grids not only as electric vehicles move but also over the communication network. In addition to the energy transfer adjustment performed by the control apparatus of each of the unit grids within the unit grid, the management server extracts a combination of unit grids in order to share power between the unit grids. As a result, energy can be efficiently used in the community including the plurality of unit grids connected to the management server over the communication network.

The energy system in the present invention may be the energy system having the below figuration, "wherein at least some of the unit grids constituting the community each includes a heat load that consumes heat and a heat storage apparatus that converts the power supplied from the renewable energy power generator or power discharged from the mobile storage battery into heat and that stores the heat, wherein the heat storage apparatus includes a thermal insulation layer that thermally insulates a container storing a medium for storing heat, and wherein the thermal insulation layer is a vacuum thermal insulation layer in which a wall of the container has a double-wall structure and a space between two walls is a vacuum or a thermal insulation layer in which a plurality of vacuum thermal insulation members, each of which is obtained by covering a porous core material with a film and an internal space of the film is depressurized, are stacked on one another".

Here, the "heat storage apparatus" may be a combination of a heat conversion apparatus that heats a medium using power, such as a heat pump or an electric heater, and a heat storage tank including a container storing the heated medium.

The medium for storing heat may be water, a refrigerant such as hydrofluorocarbon, a solid heat storage material such as ceramic balls. Alternatively, a latent heat storage material (PCM material) that consumes heat at phase transition may be used as at least a part of the medium for storing heat. When a latent heat storage material is used as the medium for storing heat, heat storage density of the heat storage apparatus increases. Especially when a latent heat storage material combined with ammonium alum or the like is used, the amount of heat stored becomes 10 times as large as when high-temperature water (hot water) is used as the medium, and the capacity of the heat storage tank can be reduced to about one-fifth of that when hot water is used as the medium.

In this configuration, the heat storage apparatus is included in addition to the mobile storage battery as a component for storing a surplus of power generated by the renewable energy power generator, and heat stored in the heat storage apparatus can be used to satisfy heat demand of a heat load. As a result, power generated by the renewable energy power generator is not wasted and can be used more effectively.

In addition, the heat storage apparatus in this configuration includes a thermal insulation layer that produces an excellent thermal insulation effect, such as a vacuum thermal insulation layer or a thermal insulation layer in which a plurality of vacuum thermal insulation members are stacked on one another. The heat storage apparatus, therefore, can store heat for a long time while suppressing a heat loss due to radiation and balance power supply from the renewable energy power generator, with which the amount of power generated inevitably significantly fluctuates depending on weather conditions or the like, and demand. A heat transfer coefficient of the heat storage tank including the thermal insulation layer is desirably 0.06 $W/(m^2 \cdot K)$ to 0.36 $W/(m^2 \cdot K)$, details of which will be described later.

Next, an energy transfer adjustment method in the present invention is an energy transfer adjustment method used in the above-described energy system, "wherein the renewable energy power generators of at least some of the unit grids constituting the community are photovoltaic generators, and wherein an imbalance caused in each of the unit grids including the photovoltaic generators between power demand of the power load and an amount of power supplied from the photovoltaic generator to the power load due to a day and night difference in an amount of power generated by the photovoltaic generator is adjusted by charging of the mobile storage battery from the photovoltaic generator and discharging of the mobile storage battery to the power load".

In the energy system in the present invention, the electric vehicle receives supply of power to the mobile storage battery thereof at a destination unit grid. Even when the renewable energy power generator is a photovoltaic generator and the electric vehicle moves to another place during the daytime, when the amount of power generated is large, therefore, power generated during the daytime can be efficiently stored in the mobile storage battery in the entirety of the system. Imbalance between supply and demand caused by a daytime and nighttime difference in the amount of power generated through photovoltaic power generation, therefore, can be effectively smoothed by charging the mobile storage battery of the electric vehicle and supplying power to the power load through discharge.

The energy transfer adjustment method in the present invention may be the energy transfer adjustment method having the below configuration, "wherein a combination of a first unit grid whose facility is a general house and a second unit grid whose facility is a workplace of a resident of the house is included as the cooperative grids, wherein a commuter vehicle that belongs to at least the first unit grid and that is used for commuting is included as the electric vehicle, and wherein a combination of a first unit grid whose facility is a general house and a second unit grid whose facility is a workplace of a resident of the house is included as the cooperative grid, wherein at least a commuter vehicle that belongs to the first unit grid and that is used for commuting is included as the electric vehicle, and wherein the commuter vehicle receives, when parked at the workplace, supply of power to the mobile storage battery from the renewable energy power generator of the second unit grid and, if power becomes insufficient for the power demand of the power load in the house when parked at the house, discharges from the mobile storage battery and supplies power to the power load".

In this configuration, a general house and a workplace where a resident of the house frequently travels back and forth are set as a combination of unit grids that form a cooperative grid. When the resident uses an electric vehicle for commuting, it is usually difficult to effectively use power generated by the renewable power generator for the electric vehicle for commuting, because the resident does not stay home about half a day even if the renewable energy power generator is provided at the home. Alternatively, a stationary storage battery needs to be provided at home in order to temporarily store power generated by the renewable energy power generator in time when the electric vehicle for commuting is not parked at home and supply the power to the electric vehicle later. In the energy transfer adjustment method, on the other hand, since the renewable energy power generator at the workplace charges the mobile storage battery of the electric vehicle for commuting, energy can be stored without wasting a long time for which the electric vehicle is parked at the workplace, and a need for the stationary storage battery can be reduced. The "commuter vehicle" is used at least for commuting, but may be used for purposes other than commuting.

In this configuration, the first unit grid desirably further includes an commonly used vehicle parked at the house for longer time than the commuter vehicle. The commonly used vehicle receives, when parked at the house, supply of power to a mobile storage battery thereof from the renewable energy power generator of the first grid and, if power is insufficient for the power demand of the power load in the house, supplies power to the power load by discharging the mobile storage battery. When the commonly used vehicle parked at the house for longer time than the commuter vehicle is also included as electric vehicles, power generated by the renewable energy power generator provided for the house can be used more effectively. In the cooperative grid whose combination of unit grids is a house and a workplace provided with two vehicles for commuting and common use as electric vehicles, $CO_2$ emissions can be significantly reduced, details of which will be described later.

The energy transfer adjustment method in the present invention may be the energy transfer adjustment method having the below configuration, "wherein at least some of the unit grids constituting the community each includes a heat load that consumes heat and a heat storage apparatus that converts power into heat and that stores the heat, and wherein the heat storage apparatus stores heat using the power supplied from the renewable energy power generator or the mobile storage battery and supplies the heat to the heat load".

In a unit grid including a heat storage apparatus, the heat storage apparatus may also be selected as a component for storing the surplus power along with the mobile storage battery, and heat stored in the heat storage apparatus is used to satisfy heat demand of a heat load. Power generated by the renewable energy power generator, therefore, is not wasted and can be used more effectively.

The energy transfer adjustment method in the present invention may be the energy transfer adjustment method having the blow configuration, "wherein the electric vehicles belonging to the unit grids constituting the community transfer power to and from each other through a charge and discharge apparatus".

By transferring power between the electric vehicles through the charge and discharge apparatus in addition to the transfer of power between the electric vehicles and the facilities, means for sharing power in the community are diversified. As a result, power generated in the community can be used more effectively, and the dependence upon the conventional electric power system can be further reduced.

The energy transfer adjustment method in the present invention may be the energy transfer adjustment method having the below configuration, "wherein each of the unit grids includes a control apparatus that performs energy transfer adjustment, wherein the control apparatus controls transfer of power through a current path for performing at least supply of power to the power load, supply of power to the mobile storage battery, or discharge of the mobile storage battery on a basis of detection of numerical data including an amount of power generated by the renewable energy power generator, power demand of the power load, and an amount of power stored in the mobile storage battery, wherein each of the unit grids includes, as the current path, a conventional electric power system path for receiving supply of power through a conventional electric power system line or flowing power backwards to the conventional electric power system line, and wherein the control apparatus performs the control such that transfer of power through the conventional electric power system path becomes minimal".

As described later, by performing the control in accordance with simple, basic rules, the amount of power supplied through the conventional electric power system line and the amount of power flowing backwards to the conventional electric power system line can be minimized.

The energy transfer adjustment method in the present invention may be the energy transfer adjustment method having the below configuration, "wherein the control apparatus stores time-series actual values in a certain period in past as the numerical data and performs the control on a basis of the actual values and the numerical data at a present time".

By using time-series actual values in the past, power demand and the like over a certain period of time from the present time can be predicted, and the energy transfer adjustment can be performed more appropriately on the basis of the prediction.

The energy transfer adjustment method in the present invention may be the energy transfer adjustment method having the below configuration, "wherein the control apparatus obtains weather forecast information over a communication network and performs the control while referring to the obtained weather forecast information".

By referring to the weather forecast information, the power demand and the like can be predicted more accurately. If it is predicted on the basis of the weather forecast information that the amount of power generated by the photovoltaic generator will be excessive, an output of the photovoltaic generator can be suppressed, and the amount of power generated can be accurately controlled such that a waste of power generated through photovoltaic power generation is reduced.

The energy transfer adjustment method in the present invention may be the energy transfer adjustment method having the below configuration, "wherein each of the control apparatuses of the plurality of unit grids is connected to a management server over a communication network,
wherein the control apparatus transmits the numerical data to the management server over the communication network, and
wherein the management server
stores the received numerical data and identification information regarding the unit grid in a database while associating the numerical data and the identification information with each other, and
extracts a combination of the unit grids that form the cooperative grid for transferring power on a basis of an excess or a shortage of power in each of the unit grids".

This is the energy transfer adjustment method used in the energy system having the above-described configuration.

Advantageous Effects of Invention

As described above, according to the present invention, an energy system capable of reducing the dependence upon conventional electric power system and a need for large-capacity stationary storage batteries by effectively using renewable energy and an energy transfer adjustment method used in the energy system can be provided.

BRIEF DESCRIPTION OF THE DRAWINGS

FIG. 7A is a graph illustrating a result of a simulation about power demand, FIG. 7B is a graph illustrating a result of a simulation about the amount of photovoltaic power generated, and FIG. 7C is a graph illustrating a result of a simulation about the amount of power supplied through a conventional electric power system line.

FIG. 8A is a graph illustrating a result of a simulation about the amount of power charged to a mobile storage battery, FIG. 8B is a graph illustrating a result of a simulation about the amount of power supplied from the mobile storage battery, and FIG. 8C is a graph illustrating a result of a simulation about the amount of power remaining in the mobile storage battery.

FIG. 9A is a graph illustrating a result of a simulation about the amount of water heated in a heat storage apparatus, and FIG. 9B is a graph illustrating a result of a simulation about the amount of hot water stored in the heat storage apparatus.

FIGS. 10A and 10B are graphs illustrating $CO_2$ emissions calculated from the results of the simulations.

DESCRIPTION OF THE EMBODIMENTS

Figure 1:
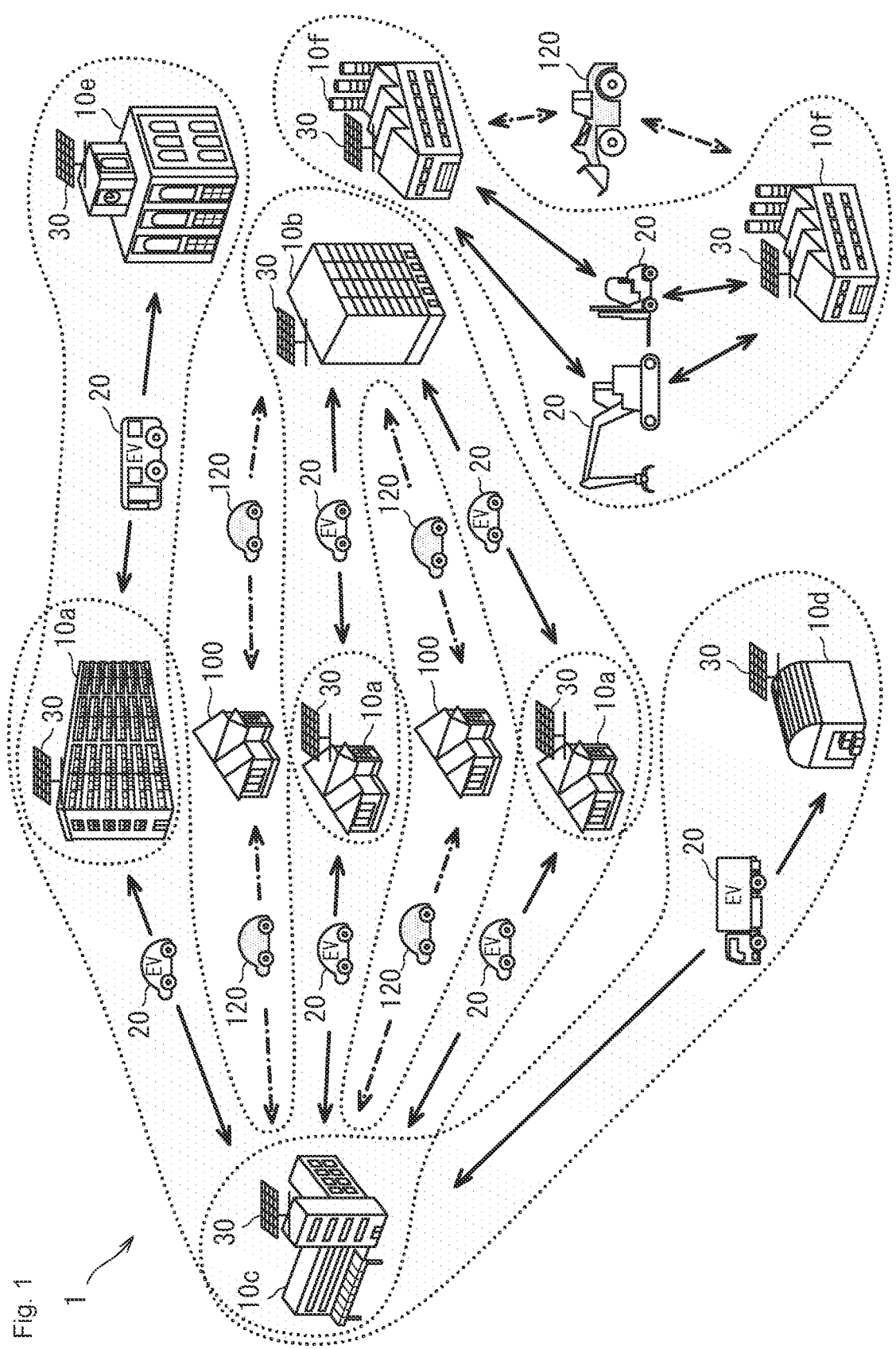
FIG. 1 is a diagram schematically illustrating a schematic configuration of an energy system in the present invention.

An energy system, which is a specific embodiment of the present invention, and an energy transfer adjustment method used in the energy system will be described hereinafter with reference to the drawings.

An energy system 1 according to the present embodiment is an energy system in a community provided with a plurality of unit grids, which are energy transfer networks of single-unit facilities 10 including power loads 35 that consume power. The unit grids constituting the community each include a photovoltaic generator 30 as a renewable energy power generator that generates power using renewable energy. Each of the unit grids supplies power generated by the photovoltaic generator 30 thereof to the power load 35 thereof and forms a cooperative grid that transfers energy to and from another unit grid by supplying power generated by the photovoltaic generator 30 of the other unit grid to its own power load 35 through a mobile storage battery 25, which is a storage battery mounted on an electric vehicle 20.

More specifically, as schematically illustrated in FIG. 1, when there are facilities 10a to 10f including a photovoltaic generator 30 and facilities 100 that do not include a photovoltaic generator 30, and electric vehicles 20 and non-electric vehicles 120 powered by fossil fuels are used as vehicles in a certain area (geographical area), a unit grid of one of the facilities 10a to 10f, which includes the photovoltaic generator 30, forms cooperative grids with a unit grid of another of the facilities 10a to 10f, which includes the photovoltaic generator 30, through one of the electric vehicles 20.

There are various combinations of unit grids that form cooperative grids depending on destinations (purposes of movement) of the electric vehicles 20. As schematically illustrated in FIG. 1 by hatched parts, for example, combinations of a unit grid of a general house 10a and a unit grid of a workplace 10b to which a resident of the house 10a commutes, combinations of a unit grid of a house 10a and a unit grid of a commercial facility 10c, and a combination of a unit grid of a house 10a and a unit grid of a school 10e or another public facility are cooperative grids formed as electric vehicles 20 whose main purposes are transportation of people move. When a large vehicle such as an electric bus is used as an electric vehicle 20, transportation of people who do not drive themselves can be used to transfer energy.

In addition, as schematically illustrated in FIG. 1 by the hatched parts, when an electric vehicle 20 is used for logistics purposes among a plurality of commercial facilities 10c or between a commercial facility 10c and a warehouse 10d, cooperative grids are formed as the electric vehicle 20 whose main purpose is transportation of objects moves. In addition, when an electric vehicle 20 that is an industrial device moves between industrial facilities such as a factory 10f and a construction or civil engineering facility, cooperative grids are formed as the industrial device moves for operation purposes.

That is, in the energy system 1, the electric vehicles 20 do not run in order to transfer energy but mediate transfer of energy "while" moving for some other purpose (integration of transportation of people or objects with transfer of energy). The mobile storage batteries 25 mounted on the electric vehicles 20 are originally used to store energy sources for driving, but also used to transfer energy between the unit grids.

Energy transfer relationships established as the electric vehicles 20 move are thus different from fixed, unidirectional energy supply through the conventional electric power system line 51 and change from time to time without being fixed, and a flow of energy is multidirectional.

Because power cannot be generated through photovoltaic power generation at night and the amount of power generated fluctuates depending on weather conditions in photovoltaic power generation, supply and demand need to be balanced. In the energy system 1 according to the present embodiment, however, cooperative grids for transferring energy flexibly change as the electric vehicles 20 move. Since connections in such cooperative grids are not fixed, not as in conventional systems, it is easy to centrally manage and optimize a relationship of supply and demand in each unit grid. When supply and demand can be balanced in each unit grid, supply and demand can be naturally balanced in the entirety of the community, and dependence upon conventional electric power system can be significantly reduced.

Figure 2A:
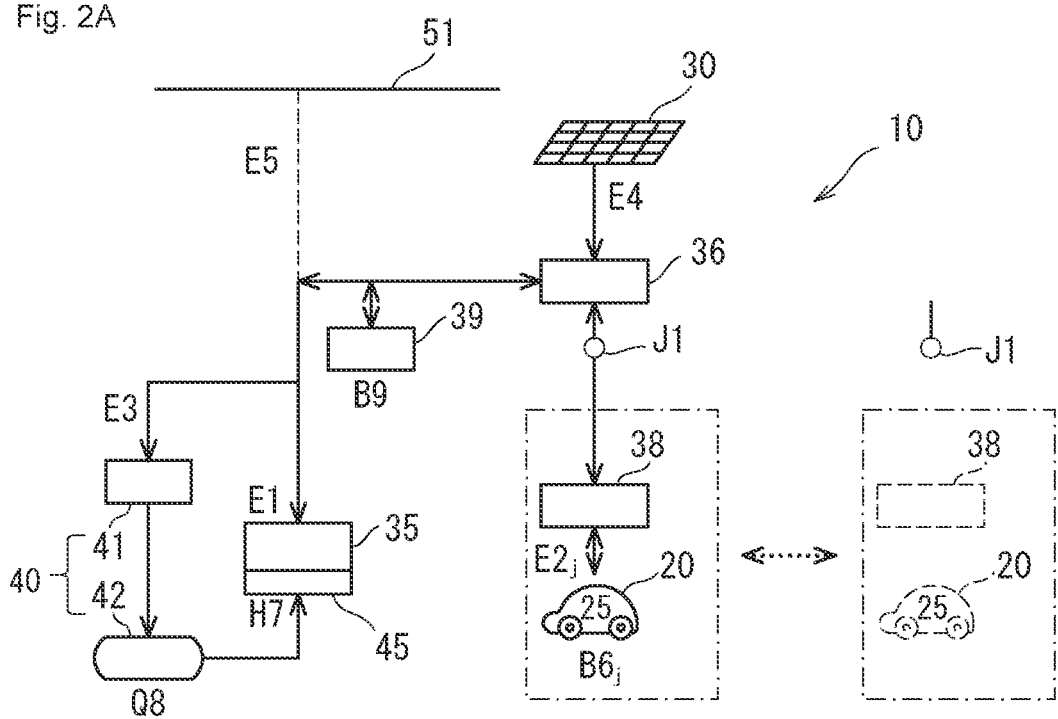
FIGS. 2A and 2B are schematic configuration diagrams of unit grids, which are elements of the energy system in the present invention.
Figure 2B:
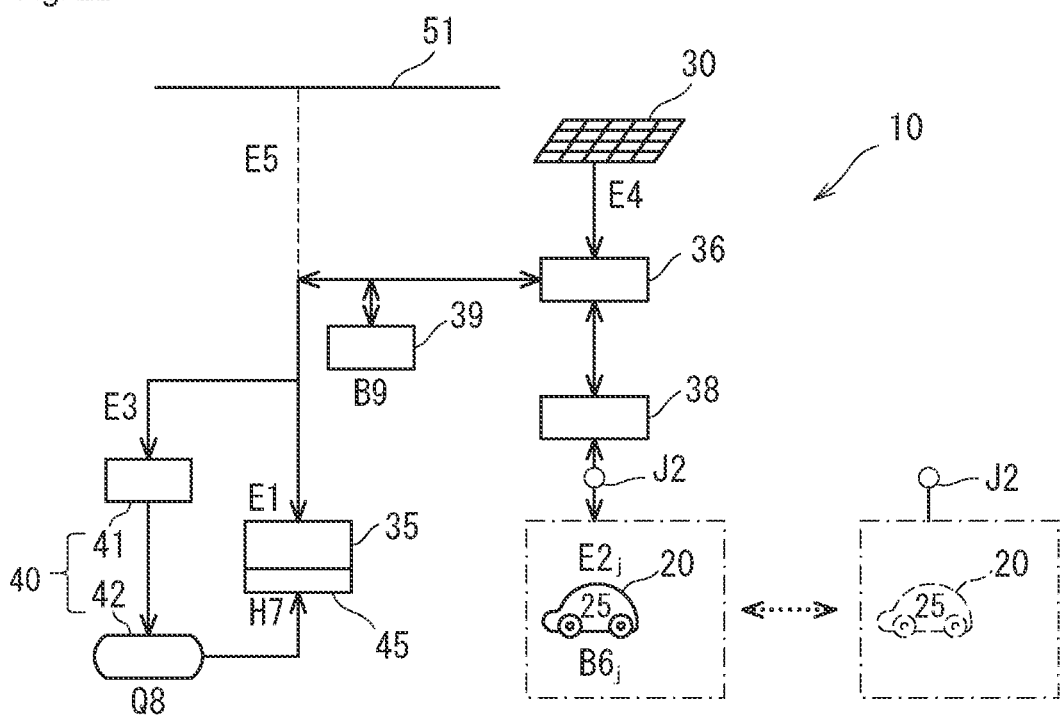

Next, control for balancing supply and demand in each unit grid will be described. As illustrated in FIGS. 2A and 2B, facilities 10 that have unit grids as energy transfer networks each include a power load 35, a photovoltaic generator 30, and electric vehicles 20. There are "n" electric vehicles 20 (n is a natural number larger than or equal to 1), and a mobile storage battery 25 is mounted on each of the electric vehicles 20. Although there is one electric vehicle 20 in each of the figures, components surrounded by a dash-dot line may be increased when there are a plurality of electric vehicles 20. The facilities 10 also each include a charge and discharge apparatus 38 (V2H apparatus) and a current conversion/adjustment apparatus 36. The charge and discharge apparatus 38 converts an alternating current into a direct current and supplies the direct current to the mobile storage battery 25 or supplies a direct current to the mobile storage battery 25 as is to charge the mobile storage battery 25 and converts a direct current discharged from the mobile storage battery 25 into an alternating current. The current conversion/adjustment apparatus 36 has a function of converting a direct current supplied from the photovoltaic generator 30 into an alternating current and sending the alternating current to the charge and discharge apparatus 38 or the power load 35, a function of adjusting, as necessary, voltage of a direct current supplied from the photovoltaic generator 30 and sending the direct current to the charge and discharge apparatus 38 as is, and a function of adjusting, as necessary, voltage of an alternating current supplied through the conventional electric power system line 51 and sending the alternating current to the charge and discharge apparatus 38.

The facilities 10 also each include an uninterruptible power supply 39. The amount of power stored in the uninterruptible power supply 39 is small, and an upper limit value thereof is set at 5 kWh. The amount of power stored corresponds to power consumed when an electric rice cooker, an electric pot, an electronic microwave oven, a washer-dryer are simultaneously used.

The facilities 10 also each include a heat load 45 and a heat storage apparatus 40. The heat storage apparatus 40 according to the present embodiment is an apparatus that electrically activates a heat conversion apparatus 41 such as a heat pump to heat water and that stores the heated water in a heat storage tank 42.

The unit grids each include a control apparatus (not illustrated) that controls supply of power to each component on the basis of outputs of sensing devices, such as sensors, that detect or measure the amount of power generated by the photovoltaic generator 30, the amount of power consumed (power demand) by the power load 35, the amount of power stored in the mobile storage battery 25, the amount of power (current and voltage) and a frequency of power supplied through the conventional electric power system line 51, the amount of power stored in the uninterruptible power supply 39, the amount of heat stored in the heat storage apparatus 40, and the amount of heat consumed (heat demand) by the heat load 45. The control apparatus is a computer including storage devices including a main storage device and an auxiliary storage device and a central processing unit (CPU). The storage devices store a program for causing a computer to function as energy transfer adjustment means. The storage devices also store numerical data received from the sensing devices in time series.

Here, the charge and discharge apparatus 38 may be included in the electric vehicle 20 or provided inside the facility 10. As illustrated in FIG. 2A, when the charge and discharge apparatus 38 is included in the electric vehicle 20, the charge and discharge apparatus 38 is connected, through a connector J1, to a current conversion/adjustment apparatus 36 of a unit grid to which the electric vehicle 20 belongs and a current conversion/adjustment apparatus 36 of another unit grid through a connector J1 of the other unit grid. The control apparatus may be included in the electric vehicles 20 and, when it is determined on the basis of detection performed by a connection detection apparatus that detects presence or absence of connection at the connector J1 that the charge and discharge apparatus 38 is connected to a current conversion/adjustment apparatus 36, the control apparatus receives the outputs of the sensing devices by wire. Alternatively, the control apparatus can receive the outputs of the sensing devices wirelessly. A current sent from the current conversion/adjustment apparatus 36 to the charge and discharge apparatus 38 through the connector J1 may be a direct current or an alternating current.

As illustrated in FIG. 2B, when the charge and discharge apparatus 38 is provided inside the facility 10, the mobile storage battery 25 of the electric vehicle 20 is connected, through a connector J2, to the charge and discharge apparatus 38 of a unit grid to which the electric vehicle 20 belongs and a charge and discharge apparatus 38 of another unit grid through the connector J2. The control apparatus may be provided inside a facility 10, and receives outputs of sensing devices inside the facility by wire or wirelessly and, when it is determined on the basis of detection performed by a connection detection apparatus that detects presence or absence of connection at the connector J2 that the mobile storage battery 25 is connected to the charge and discharge apparatus 38, the control apparatus receives the outputs of sensing devices of the electric vehicle 20 by wire or wirelessly. A current sent from the current conversion/adjustment apparatus 36 to the charge and discharge apparatus 38 may be a direct current or an alternating current, but a current sent to the charge and discharge apparatus 38 through the connector J2 is a direct current.

Transfer of power in at least a part between the photovoltaic generator 30 and the current conversion/adjustment apparatus 36, the current conversion/adjustment apparatus 36 and the power load 35, the charge and discharge apparatus 38 and the current conversion/adjustment apparatus 36, and the charge and discharge apparatus 38 and the mobile storage battery 25 may be achieved as microwave wireless power transmission, where power is converted into electromagnetic waves (microwaves) and transferred.

Next, an energy transfer adjustment method used by the control apparatus will be described. Signs used in the following description are as follows.

E1: Power demand of a power load $E2_j$: Amount of power supplied to a mobile storage battery of a j-th electric vehicle (j≤n)

E3: Amount of power supplied to a heat storage apparatus

E4: Amount of power generated by a photovoltaic generator

E5: Amount of power supplied through a conventional electric power system line or amount of power flowing backwards to the conventional electric power system line $B6_j$: Amount of power stored in the mobile storage battery of the j-th electric vehicle B9: Amount of power stored in an uninterruptible power supply H7: Heat demand of a heat load Q8: Amount of heat stored in a heat storage apparatus The control apparatus performs energy transfer adjustment in accordance with following basic rules on the basis of the outputs of the sensing devices (the amount of power generated by the photovoltaic generator 30, the amount of power consumed by the power load 35, the amount of power stored in the mobile storage battery 25, the amount of power (current and voltage) and the frequency of power supplied through the conventional electric power system line 51, the amount of heat stored in the heat storage apparatus 40, the amount of heat consumed by the heat load 45, the amount of power stored in the uninterruptible power supply 39) or time-series actual values, which are output values of the sensing devices stored in the storage devices, such that the amount of power E5 supplied through the conventional electric power system line 51 and the amount of power E5 flowing backwards to the conventional electric power system line 51 become minimal. A current path for the amount of power E5 corresponds to a "conventional electric power system path" in the present invention.

<Basic Rules>

(1) Power generated by the photovoltaic generator 30 is supplied to the power load 35, the mobile storage battery 25, the heat storage apparatus 40, and the uninterruptible power supply 39 in this order of priority.

(2) When the heat demand exceeds the amount of heat stored, the order of priority is changed to the power load 35, the heat storage apparatus 40, the mobile storage battery 25, and the uninterruptible power supply 39. This event does not occur, however, if a sufficient amount of heat can be secured in the heat storage tank 42.

(3) When the amount of power generated by the photovoltaic generator 30 is insufficient for the power demand of the power load 35, discharge of the mobile storage battery 25, discharge of the uninterruptible power supply 39, and supply through the conventional electric power system line 51 are performed in this order of priority.

(4) When there are a plurality of mobile storage batteries 25, order of charge and order of discharge are set in advance.

Here, the control apparatus can obtain weather forecast information over a wired or wireless communication network and use the obtained information to control the energy transfer adjustment. For example, the control apparatus stores the obtained weather forecast information in the storage devices in time series and compares weather conditions in a period from a certain period of time ago to present time and weather conditions in a certain period in the past with each other. By reading, from the storage devices, actual values of the amount of power consumed in a certain period in the past when similarity of weather conditions is high, the amount of power that will be consumed in a period from the present time to a certain period of time later can be predicted on the basis of the read actual values. As a result, the energy transfer adjustment can be performed with the predicted amount of power determined as the "power demand of the power load 35".

Figure 5:
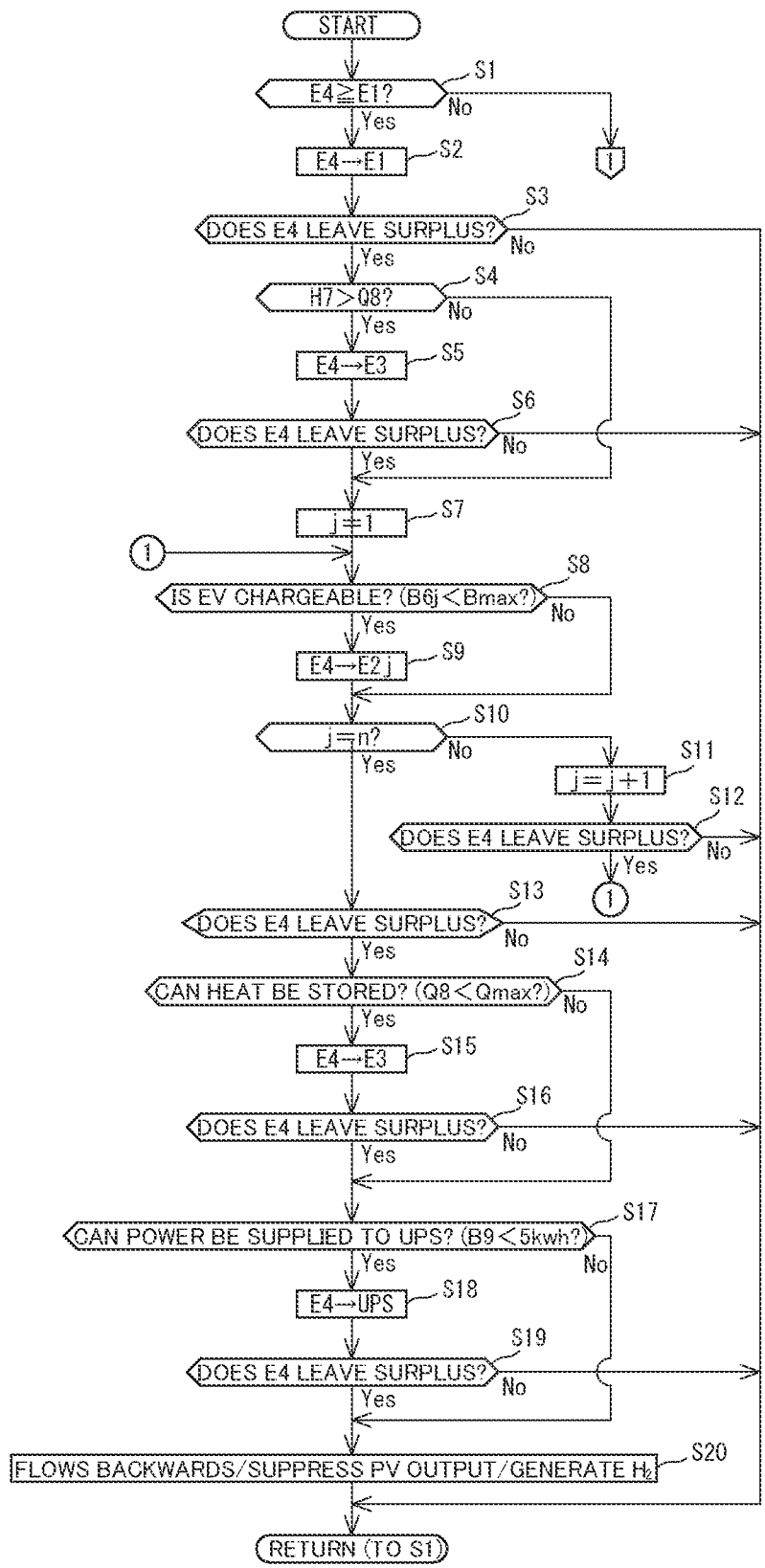
FIG. 5 is a flowchart illustrating control of energy transfer performed in the first unit grid.

As illustrated in FIG. 5, in the energy transfer adjustment, first, whether the amount of power E4 generated by the photovoltaic generator can satisfy the power demand E1 of the power load is determined (step S1). If the amount of power E4 generated by the photovoltaic generator can satisfy the power demand E1 of the power load (Yes in step S1), the power (hereinafter referred to as "PV power") generated by the photovoltaic generator is supplied to the power load (step S2), and whether the PV power leaves a surplus is determined (step S3). If the PV power leaves a surplus (Yes in step S3), whether the heat demand H7 of the heat load exceeds the amount of heat Q8 stored in the heat storage apparatus is determined (step S4). If the heat demand H7 is larger than the amount of heat Q8 stored (Yes in step S4), the PV power is supplied to the heat storage apparatus (step S5), and whether the PV power still leaves a surplus is determined (step S6). As described in the above rule (2), however, when a sufficient amount of heat is secured, the heat demand H7 does not usually exceed the amount of heat Q8 stored (No in step S4), and the process proceeds to step S7 to check whether the mobile storage battery can be charged.

In step S7, "1" is given as j, and whether a mobile storage battery of a first electric vehicle (EV) can be charged is determined (step S8). The mobile storage battery can be charged when the electric vehicle is located at the facility and the amount of power ($B6_j$) stored is smaller than a capacity ($B_{max}$) of the mobile storage battery. If the mobile storage battery can be charged (Yes in step S8), the PV power E4 is used as the power $E2_j$ to be supplied to the mobile storage battery (step S9), and whether j has reached n, that is, whether chargeability of the mobile storage battery has been checked for all electric vehicles, is determined (step S10). If the chargeability of the mobile storage battery has not been checked for all the electric vehicles (No in step S10), "1" is added to j (step S11). Insofar as the PV power E4 leaves a surplus, the process returns to step S8 (Yes in step S12), and if the mobile storage battery can be charged, steps S8 to S12 are repeated.

When there are a plurality of electric vehicles and an electric vehicle with a highest priority (smallest j) is not chargeable (not located at the facility or the mobile storage battery is fully charged) (No in step S8), the same steps as above (steps S10 to S12 and returns to step S8) are performed for an electric vehicle with a second highest priority.

If the PV power E4 still leaves a surplus (Yes in step S13) after the chargeability of the mobile storage battery is determined for all the electric vehicles and chargeable mobile storage batteries are charged, whether heat can be stored in the heat storage apparatus, that is, whether the amount of heat Q8 stored in the heat storage apparatus is smaller than a heat storage capacity ($Q_{max}$), is determined (step S14). If heat can be stored in the heat storage apparatus (Yes in step S14), the PV power E4 is used as the power E3 to be supplied to the heat storage apparatus (step S15).

If heat cannot be charged in the heat storage apparatus (No in step S14), or if the PV power E4 still leaves a surplus after step S15 (Yes in step S16), whether power can be supplied to the uninterruptible power supply (UPS), that is, whether the amount of power B9 stored is smaller than 5 kWh, which is an upper limit of the amount of power set for the uninterruptible power supply, is determined (step S17). If power can be supplied to the uninterruptible power supply, the PV power E4 is supplied to the uninterruptible power supply (step S18).

The uninterruptible power supply is a component with a lowest priority, but if the PV power E4 still leaves a surplus (Yes in step S19) after power is supplied to the uninterruptible power supply, or if power cannot be supplied to the uninterruptible power supply (No in step S17) even though the PV power E4 leaves a surplus (Yes in step S16), the PV power E4 flows backwards to the conventional electric power system line (step S20). Alternatively, total area of solar panels of the photovoltaic generator may be divided into a plurality of area-pieces and each of the area-pieces may be capable of individually outputting power. If the PV power E4 leaves a surplus, only some of the area-pieces of the solar panels may output power in order to suppress an output of the photovoltaic generator.

If the PV power E4 no longer leaves a surplus somewhere between step S1 and step S20 (No in step S3, S6, S12, S13, S16, or S19), the process returns to step S1.

As described above, in the control of the energy transfer adjustment according to the present embodiment, if power generated by the photovoltaic generator is larger than the demand of the power load, the power is preferentially supplied to the power load and then distributed between the mobile storage battery, the heat storage apparatus, and the uninterruptible power supply so that the amount of power supplied through the conventional electric power system line becomes zero.

Figure 6:
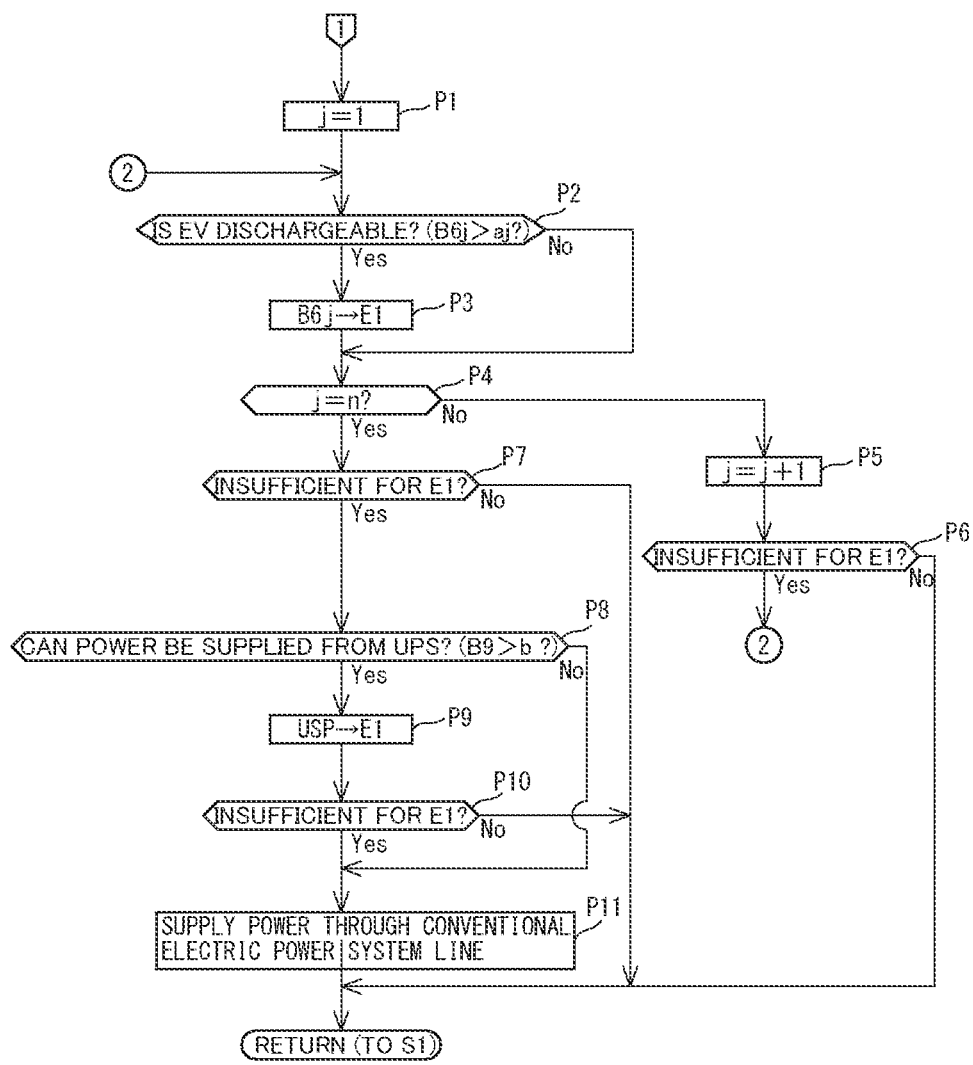
FIG. 6 is another flowchart, continued from FIG. 5, illustrating the control of energy transfer performed in the first unit grid.

On the other hand, if the amount of power E4 generated by the photovoltaic generator does not satisfy the power demand E1 of the power load (No in step S1), the process proceeds to step P1 as illustrated in FIG. 6, and it is checked whether the mobile storage battery of the electric vehicle can be discharged. In step P1, "1" is added to j, and whether a mobile storage battery of a first electric vehicle can be discharged is determined (step P2). The mobile storage battery can be discharged when the electric vehicle is located at the facility and the amount of power ($B6_j$) stored is larger than a predetermined amount of power $a_j$. The amount of power $a_j$ is a value determined by a user (a resident of the facility) for each electric vehicle and, for example, set as the amount of power to be left in the mobile storage battery in consideration of a purpose of use (destination) of the electric vehicle. The storage battery cannot discharge 100% of the capacity thereof. The amount of power $a_j$, therefore, is set in consideration of a limit (e.g., 0.2 $B_{max}$) to discharge of the mobile storage battery.

If the mobile storage battery can be discharged (Yes in step P2), the mobile storage battery is discharged until the amount of power stored in the mobile storage battery becomes $a_j$ and power is supplied to the power load (step P3). Whether j has reached n, that is, whether dischargeability of the mobile storage battery has been checked for all the electric vehicles, is then determined (step P4). If there is still an electric vehicle for which the dischargeability of the mobile storage battery has not been checked (No in step P4), "1" is added to j (step P5). Insofar as power is insufficient for the power load, the process returns to step P2 (Yes in step P6), steps P2 to P6 are repeated, insofar as the mobile storage battery can be discharged.

If there are a plurality of electric vehicles and an electric vehicle with a highest priority (smallest j) is not dischargeable (not located at the facility or $B6_j$ is smaller than or equal to $a_j$) (No in step P2), the same steps as above (steps P4 to P6 and returns to step P2) are performed for an electric vehicle with a second highest priority.

If power is still insufficient for the power load (Yes in step P7) after the dischargeability of the mobile storage battery is determined for all the electric vehicles and, if dischargeable mobile storage batteries are discharged, whether power can be supplied from the uninterruptible power supply is determined (step S8). Power can be supplied from the uninterruptible power supply when the amount of power (B9) stored is larger than a predetermined amount of power b. The amount of power b is set by the user (the resident of the facility) as the amount of power to be left in the uninterruptible power supply. If possible (Yes in step S8), power is supplied to the power load until the amount of power left in the uninterruptible power supply becomes b (step S9).

If power supplied to the power load is insufficient even after the uninterruptible power supply supplies power to the power load (Yes in step P10), or if power cannot be supplied from the uninterruptible power supply (No in step P8), power is supplied through the conventional electric power system line (step S11), and the process returns to step S1. If the demand of the power load can be satisfied by power discharged from the mobile storage battery(s) or power supplied from the uninterruptible power supply (No in step P6, P7, or P10), the process returns to step S1.

It is mainly at night (after sunset) when the amount of power E4 generated by the photovoltaic generator cannot satisfy the power demand E1 of the power load. Because an electric vehicle that has gone out of the facility during the daytime has returned to the facility at night and its mobile storage battery has been charged at another unit grid during the daytime, the power load can usually be satisfied only through discharge of the mobile storage battery. In the present embodiment, therefore, the uninterruptible power supply can be used as a storage of power for an emergency such as a power failure, when supply of power through the conventional electric power system line stops.

Should the amount of power E4 generated by the photovoltaic generator not satisfy the power demand E1 of the power load and the amount of heat stored not satisfy the heat demand, "E1" in a flow of steps P1 to P11 may be replaced by the "sum of E1 and E3". This event does not occur, however, if a sufficient amount of heat can be secured in the heat storage tank as described above.

As described above, the energy transfer adjustment can be performed in each unit grid through control according to the very simple rules (1) to (4) such that the amount of power E4 generated by the photovoltaic generator is effectively used and the amount of power E5 transferred to and from the conventional electric power system line 51 becomes smallest. Results of simulations of energy balances based on actual values in an example of the energy system according to the present embodiment will be described hereinafter.

Figure 3:
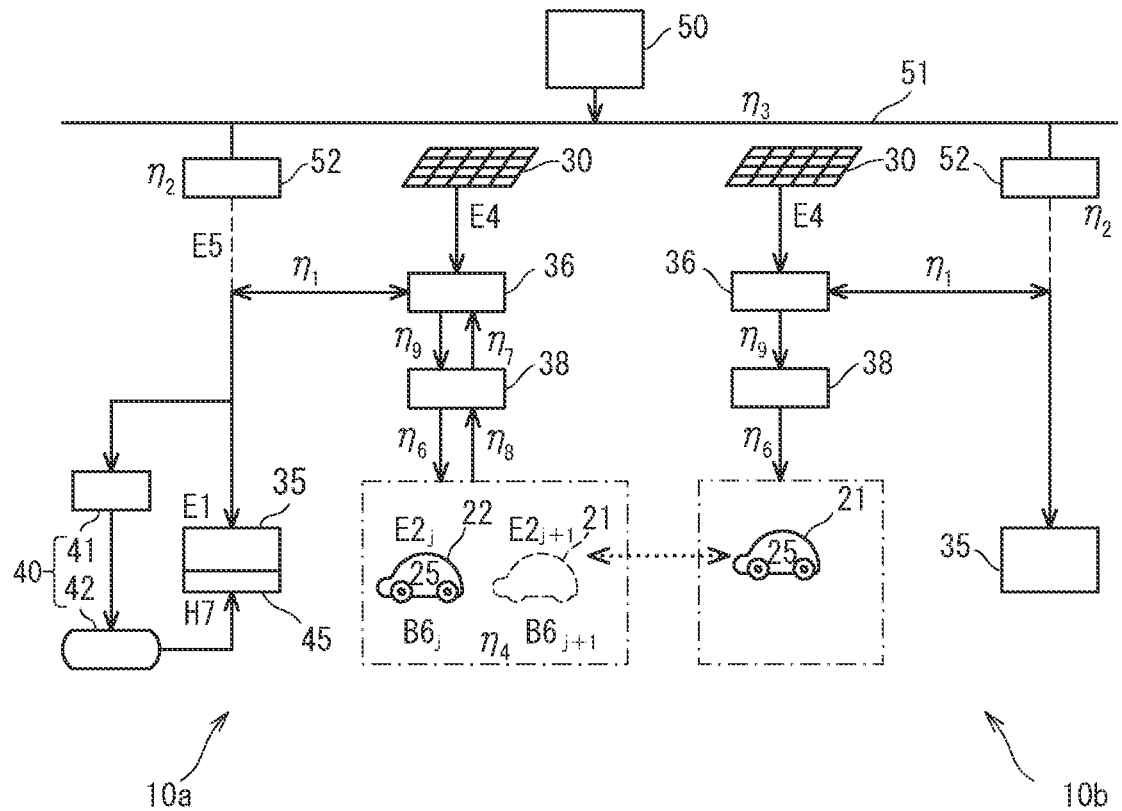
FIG. 3 is a schematic configuration diagram of a cooperative grid consisting of a first unit grid and a second unit grid.

As illustrated in FIG. 3, a combination of unit grids that form cooperative grids in the example was a first unit grid whose facility was a general house 10a and a second unit grid whose facility was a workplace 10b of a resident of the house 10a. In the first unit grid and the second unit grid, photovoltaic generators 30 were installed in spaces above parking spaces (roofs of parking lots) for electric vehicles 20.

As with the unit grids illustrated in FIGS. 2A and 2B, the first unit grid was configured to include a power load 35, electric vehicles 20, a heat load 45, and a heat storage apparatus 40 consisting of a heat conversion apparatus 41 and a heat storage tank 42, in addition to the photovoltaic generator 30. In a kitchen of the first unit grid, an electromagnetic cooker was used without using gas, and an air conditioner as the power load 35 and a floor heater as the heat load 45 were used for air conditioning. Two electric vehicles 20 were provided. One was a commuter vehicle 21 used to commute to the second unit grid, and the other was a commonly used vehicle 22 that parked at the house 10a for a longer time than the commuter vehicle 21.

In order to make the simulations simple, the second unit grid included a photovoltaic generator 30 and a power load 35 but did not include an electric vehicle 20, a heat load 45, or a heat storage apparatus 40. Both the first unit grid and the second unit grid could bring in, through transformers 52, power sent, through the conventional electric power system line 51, from a large power plant 50 that generated power using fossil fuels.

When parked at the house 10a or the workplace 10b, the commuter vehicle 21 charged a mobile storage battery 25 thereof from the corresponding photovoltaic generator 30. When parked at the house 10a, the commonly used vehicle 22 charged a mobile storage battery 25 thereof from the photovoltaic generator 30. In order to make the simulations simple, however, the commonly used vehicle 22 did not charge the mobile storage battery 25 thereof at a destination.

Figure 4:
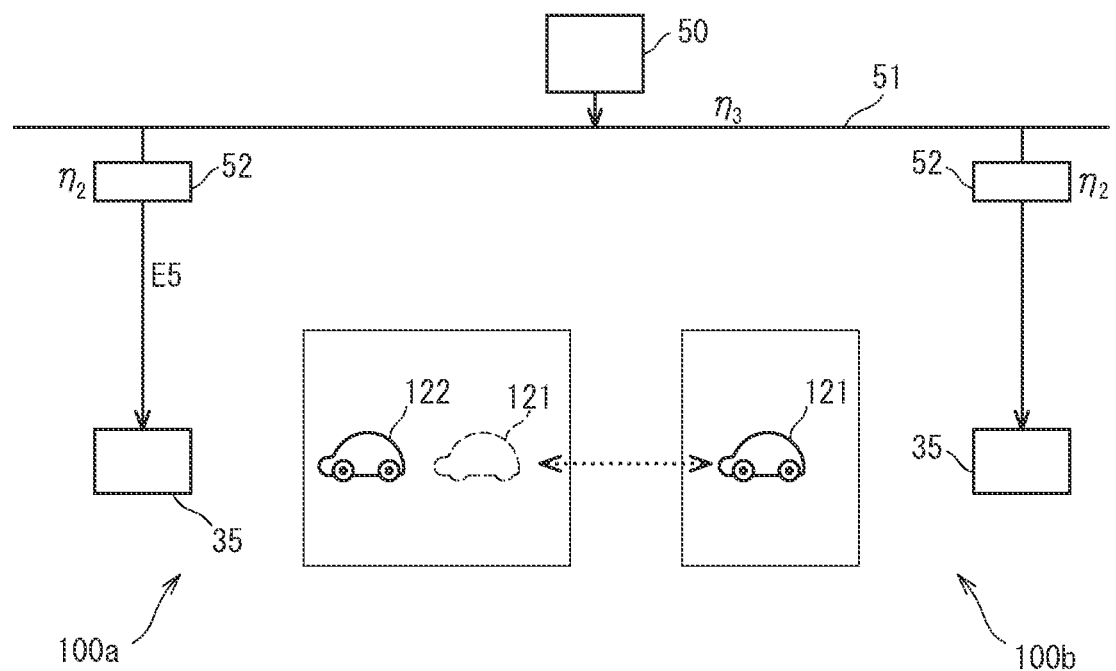
FIG. 4 is a schematic configuration diagram of a conventional energy system.

As a comparative example, as illustrated in FIG. 4, simulations of energy balances were conducted in a similar manner with a conventional energy system in which power sent, through a conventional electric power system line 51, from a large power plant 50 that generated power using fossil fuels was supplied to a house 100a that was not provided with a photovoltaic generator and a heat storage apparatus and a workplace 100b that was not provided with a photovoltaic generator, and two non-electric vehicles (a non-electric commuter vehicle 121 and a non-electric commonly used vehicle 122) that used gasoline as a fuel were used as vehicles. In this comparative example, liquefied petroleum gas (LPG) was used for a kitchen and hot water supply, and kerosene was used for heating.

In the simulations, Math. (1) was used for a power balance of photovoltaic power generation, Math. (2) was used for a power balance at the facilities (the house and the workplace), Math. (3) was used for a power balance of the mobile storage batteries, and Math. (4) was used for a heat balance of the heat storage tank.

[Math. 1]
$$E_{PVi}(t) = \frac{E_{PVACi}(t) + E_{PVHP}(t)}{\eta_1} + \frac{E_{PVEVij}(t)}{\eta_9} + E_{SURi}(t) \quad (1)$$

[Math. 2]
$$E_{PSi}(t) + E_{PVACi}(t) + \eta_8 \cdot E_{EVDCij}(t) = E_{ci}(t) + \frac{E_{PSEVij}(t)}{\eta_6} + E_{PSHP}(t) \quad (2)$$

[Math. 3]
$$BE_j(t+1) - BE_j(t) = E_{PVEVij}(t) + E_{PSEVij}(t) - \frac{E_{CEVj}(t) + E_{EVDCij}(t)}{\eta_4} \quad (3)$$

[Math. 4]
$$BH(t+1) - BH(t) = 3.6 COP(t) \cdot (E_{PVHP}(t) + E_{PSHP}(t)) - H_W(t) - H_h(t) - r \cdot BH(t) \quad (4)$$

Restrictive conditions of the apparatuses are represented by Math. (5) to Math. (7), and power supply conditions via the conventional electric power system line are represented by Math. (8) to Math. (10).

[Math. 5]
$$0.2 BE_{CAPj} \leq BE_j(t) \leq BE_{CAPj} \quad (5)$$

[Math. 6]
$$0 \leq BH(t) \leq BH_{CAP} \quad (6)$$

[Math. 7]
$$3.6 COP(t) \cdot (E_{PVHP}(t) + E_{PSHP}(t)) \leq E_{HPCAP} \quad (7)$$

[Math. 8]
$$E_{PSi}(t) \geq 0 \quad (8)$$

[Math. 9]
$$\text{IF } BE_j(t+1) < BE_{NJ}(t+1) \quad (9)$$
$$\text{then } E_{PSEVij} = BE_{Nj}(t+1) - BE_j(t+1)$$

[Math. 10]
$$\text{IF } BH(t+1) < BH_N(t+1) \quad (10)$$
$$\text{then } E_{PSHP}(t) = \frac{BH_N(t+1) - BH(t+1)}{3.6 COP(t)}$$

In Math. (1) to Math. (10), however:
t: Time [h]
i: Facility No. (i=1: house, i=2: workplace)
j: Electric vehicle No. (j=1: for commuting, j=2: for commonly use)
$E_{PV}$: Amount of PV power generated [kWh]
$E_{PVAC}$: Amount of PV power supplied to the facility [kWh]

$E_{PVHP}$: Amount of PV power supplied to the heat storage apparatus [kWh]
$E_{PVEV}$: Amount of PV power supplied to the EV [kWh]
$E_{SUR}$: Amount of a surplus power [kWh]
$E_{PS}$: Amount of power supplied through a conventional electric power system line to the facility [kWh]
$E_{EVDC}$: Amount of EV power supplied to the facility [kWh]
$E_C$: Power demand of the facility [kWh]
$E_{PSEV}$: Amount of power supplied through the conventional electric power system line to the EV [kWh]
$E_{PSHP}$: Amount of power supplied through the conventional electric power system line to the heat storage apparatus [kWh]
BE: Power remaining in the mobile storage battery [kWh]
$E_{CEV}$: Power demand of the EV [kWh]
BH: Amount of heat stored in the heat storage tank [MJ]
COP: Coefficient of performance of the heat conversion apparatus
$H_W$: Hot-water demand [MJ]
$H_h$: Heating demand [MJ]
r: Heat radiation rate of the heat storage tank
$BE_{CAP}$: Capacity of the mobile storage battery [kWh]
$BH_{CAP}$: Capacity of the heat storage tank [MJ]
$H_{HPCAP}$: Rated heating capacity [MJ]
$BE_N$: Minimum amount of power per day required for the EV to run [kWh]
$BH_N$: Minimum amount of heat per day required for hot water supply and heating [MJ]
$\eta_1$ to $\eta_9$: Energy conversion efficiency In the simulations, the power balance of the photovoltaic power generation, the power balance of the mobile storage batteries, and the heat balance of the heat storage tank were calculated every minute and the energy balance of the power demand was calculated every hour such that time-series actual values of power consumption in every hour over 1 year at the facilities were satisfied (the house and the workplace; the workplace is a certain university in Okayama Prefecture). Experimental values shown in Table 1 were used as energy conversion efficiency.

TABLE 1

| | |
|---|---|
| $\eta_1$: PCS efficiency | 0.88 |
| $\eta_2$: Transformer efficiency (in the Power System) | 0.97 |
| $\eta_3$: Transmission efficiency | 0.99 |
| $\eta_4$: Charging and discharging efficiency | 0.94 |
| $\eta_5$: Motor efficiency | 0.90 |
| $\eta_6$: AC/DC converter efficiency (charging to EV) | 0.90 |
| $\eta_7$: DC/AC inverter efficiency (supplying from EV) | 0.85 |
| $\eta_8$: DC/DC converter efficiency (supplying from EV) | 0.94 |
| $\eta_9$: DC/DC converter efficiency (charging to EV) | 0.97 |

It is desirable to provide, as the photovoltaic generator, a solar panel whose output in unit area is 190 W/m² for each electric vehicle with an area of 4 m² to 25 m². A power generation output of the photovoltaic generator is 0.76 kW to 4.75 kW, which is, as described later, suitable as the amount of power supplied to be balanced with power demand in the unit grid. Because the area of 4 m² to 25 m² corresponds to 50% to 200% of a parking space when an electric vehicle is a standard-sized automobile, the photovoltaic generator can be installed by effectively using a space above a parking space, such as a roof of a parking lot.

Here, a solar panel whose maximum output was 240 W and whose output in unit area was 190 W/m² was used, and installation area of the solar panel was 27 m² at the house for two vehicles and 12.5 m² at the workplace, which corresponded to area of a parking space for one vehicle. The installation area of the photovoltaic generator at the house was set such that the amount of the surplus power generated through photovoltaic power generation became 3% in the entirety of an energy system consisting of cooperative grids of the house and the workplace.

As the mobile storage batteries, ones whose mobile storage battery capacity was 13 kWh (commuter vehicle) and 40 kWh (commonly used vehicle), whose electric mileage was 9.1 km/kWh, and whose dischargeable range is higher than or equal to 20% and lower than 100% were used. The mobile storage battery capacity was determined on the basis of actual driving distances for 1 year such that a longest driving distance was satisfied.

A heat-up temperature of the heat storage apparatus was desirably higher than or equal to 80° C. and lower than 100° C., but here the heat-up temperature was 90° C., a reheating temperature was 65° C., and a hot water supply temperature was 42° C. to 43° C. When hot water stored in the heat storage tank is heated, a heat pump cycle (a coefficient of performance COP was 3 to 5) of a heat pump whose heating capacity is 6.0 kW was used as a heat conversion apparatus, and an electric heater was used as a heat conversion apparatus for maintaining or increasing temperature.

Time-series data regarding the amount of photovoltaic power generated, the power demand at the facilities, and air temperature and water temperature used to estimate power consumption of the air conditioner and the heat storage apparatus were time-series actual values in 2016 in every hour.

Table 2 shows results of the simulations. Whereas a load of power supplied through the conventional electric power system line (the sum of the amount of power supplied to the facilities and power losses) in the comparative example, where the conventional energy system was used, was 14,940 kWh per year, a load of power supplied through the conventional electric power system line in the energy system in the example was 11,350 kWh per year, which was approximately a 24% reduction. It can be seen that the dependence upon the conventional electric power system was significantly reduced.

TABLE 2

| | | Example | Comparative Example | Unit |
|---|---|---|---|---|
| Amount of power supplied through conventional line | House | 2,800 | 4,970 | kWh/year |
| | Workplace | 8,100 | 9,380 | |
| Loss of power supplied through conventional line | | 450 | 590 | |
| Amount of PV power generated | House | 6,000 | — | |
| | Workplace | 2,780 | — | |
| Supply from PV to power load | House | 2,650 | — | |
| | Workplace | 1,300 | — | |
| Supply from PV to EV | House | 2,900 | — | |
| | Workplace | 1,120 | — | |
| Supply of power supplied through conventional line to EV | House | 280 | — | |
| | Workplace | 20 | — | |
| Supply from EV to power load | House | 2,360 | — | |
| Surplus in EV | House | 80 | — | |
| | Workplace | 180 | — | |

TABLE 2-continued

| | Example | Comparative Example | Unit |
|---|---|---|---|
| Gasoline (two non-electric vehicles) | House | — | 1,230 | L/year |
| LPG | House | — | 360 | kg/year |
| Kerosine | House | — | 160 | L/year |

"conventional line": conventional electric power system line

As for results in a latter half of July among the results of the simulations, the power demand (house) is illustrated in FIG. 7A, the amount of photovoltaic power generated (output: 5.1 kW) is illustrated in FIG. 7B, the amount of power supplied through the conventional electric power system line (purchased power) is illustrated in FIG. 7C, the amount of power charged to the mobile storage batteries is illustrated in FIG. 8A, the amount of power supplied from the mobile storage batteries to the power load of the house is illustrated in FIG. 8B, change in the amount of power remaining in the mobile storage batteries (the sum of the commuter vehicle and the commonly used vehicle) is illustrated in FIG. 8C, the amount of water heated in the heat storage apparatus is illustrated in FIG. 9A, and the amount of hot water stored in the heat storage apparatus is illustrated in FIG. 9B.

As can be seen from FIGS. 7A and 7B, the power demand of the house was large from around 18:00 to midnight, whereas the amount of power generated through photovoltaic power generation was large during the daytime, namely from around 8:00 to 16:00, that is, there is a time difference between supply and demand. The supply and the demand can be balanced by, as illustrated in FIG. 8A, storing a surplus of the amount of power generated through photovoltaic power generation during the daytime in the mobile storage batteries and, as illustrated in FIG. 8B, supplying power from the mobile storage batteries to the power load of the house at night. Power, therefore, hardly needs to be supplied through the conventional electric power system line as illustrated in FIG. 7C.

In addition, there are two electric vehicles belonging to the house in the energy system. One of the electric vehicles is the commuter vehicle, and the mobile storage battery thereof is charged by the photovoltaic generator at the workplace during the daytime. The mobile storage battery of the other electric vehicle, which is the commonly used vehicle, is charged by the photovoltaic generator of the house while the resident is home. Even if power is discharged at night for the power load, therefore, the amount of power remaining in the mobile storage batteries does not fall below a lower limit value as illustrated in FIG. 8C. Mobile storage batteries, therefore, function well as storage batteries storing power in a unit grid including electric vehicles. In the energy system, therefore, a need for large stationary storage batteries, which have been considered essential for houses provided with photovoltaic generators, is low.

In the energy system, power generated by the photovoltaic generator is supplied to the power load, and a surplus is charged to the mobile storage battery. If the power still leaves a surplus, the heat conversion apparatus of the heat storage apparatus is activated, and the surplus is stored as heat. As illustrated in FIGS. 9A and 9B, a certain amount of hot water stored can be secured in the energy system even if heat-up frequency is not very high. Although the heat demand of the house became large due to supply of hot water at night (used in a bath), an event that made the amount of hot water stored become close to zero did not occur, and the heat load's demand could be sufficiently met. It can be seen that the energy system is suitable as a mechanism for storing the surplus energy for a long time.

Next, results of calculation of $CO_2$ emissions based on the results of the above simulations will be shown. The following values were used as $CO_2$ emission coefficients. Power supplied through the conventional electric power
system line: 0.556 kg-$CO_2$/kWh
Gasoline: 2.62 kg-$CO_2$/L
LPG: 3.48 kg-$CO_2$/kg
Kerosine: 2.65 kg-$CO_2$/L As illustrated in FIG. 10A, $CO_2$ emissions were reduced by about 80% in each house in the energy system (cooperative grids) in the present example compared to the conventional energy system (comparative example). In the entirety of the system (the house and the workplace), as illustrated in FIG. 10B, $CO_2$ emissions were reduced by about 53% in the energy system in the present example compared to the conventional energy system. 38% out of this is a reduction effect based on replacement of energy used to generate power with renewable energy, and 15% is a power-saving effect based on the energy transfer adjustment. The energy system thus produces an excellent effect of reducing emission of $CO_2$ gas, which is one of greenhouse gases. In addition, since both the effect based on the replacement with renewable energy and the power-saving effect can be simultaneously produced with this system, the system is economically excellent.

In the above simulations, the house is provided with two electric vehicles, and the mobile storage batteries (40 kWh for commuting and 13 kWh for everyday use) of the two electric vehicles have a function (function A) as a storage battery storing power for driving, a function (function B) as a storage battery storing a surplus power of photovoltaic power generation, and a function (function C) of, when power generated through photovoltaic power generation is insufficient for the power load, discharging power for the power load. A power storage effect at a time when the mobile storage batteries have the three functions A, B, and C was compared with a case where the mobile storage batteries of the two electric vehicles having the same power storage capacity (40 kWh and 13 kWh) were used for function A and function B and a case where a stationary storage battery having the same power storage capacity (53 kWh) was used for function B.

Figure 11A:
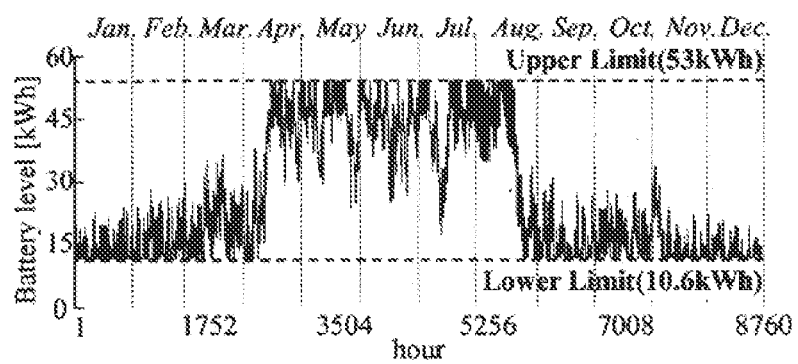
FIG. 11A is a graph illustrating a battery level at a time when a stationary storage battery is used for function B.
Figure 17:
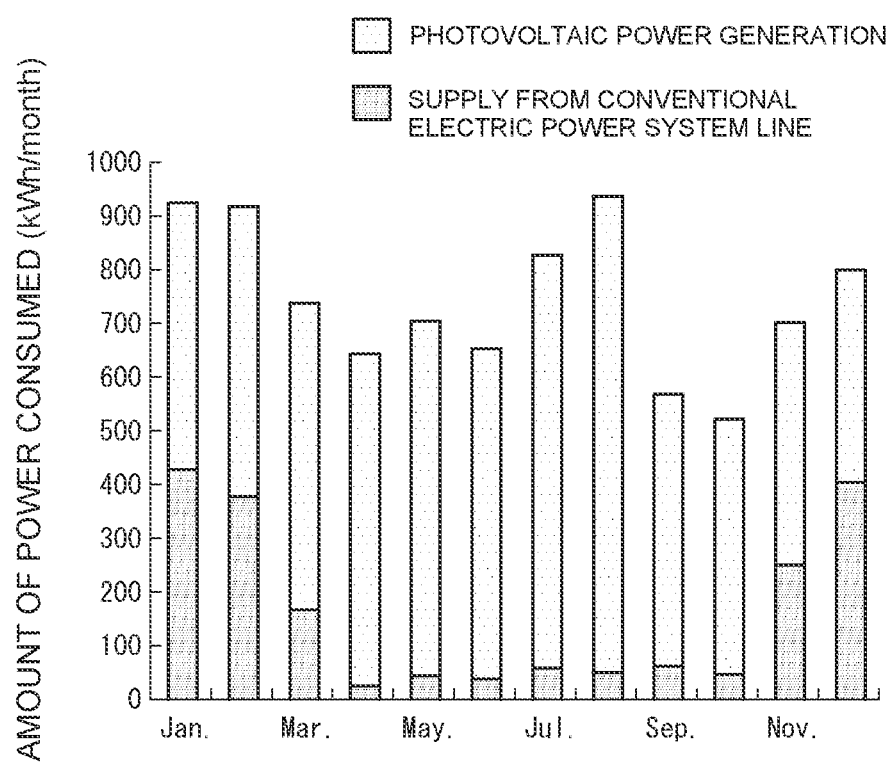
FIG. 17 is a graph in which the amount of photovoltaic power generated and the amount of power supplied through the conventional electric power system line are compared with each other over a year.

As illustrated in FIG. 17, when the amount of power generated through photovoltaic power generation and the power demand of the house are compared with each other, the amount of power generated through photovoltaic power generation fell significantly below the power demand from fall to winter (September to December and January to March), and the amount of power generated through photovoltaic power generation was large enough to satisfy most of the power demand of the house from spring to summer (April to August). As illustrated in FIG. 11*a*, when the stationary storage battery was used for function B of storing the surplus power of photovoltaic power generation, the remaining amount of power frequently reached an upper limit of the storage power capacity from spring to summer, which means that the surplus power was not charged and wasted partially. From fall to winter, on the other hand, the remaining amount of power stayed at levels lower than 40% of the power storage capacity, that is, most of the capacity of the storage battery was not used, and power storage performance of the storage battery was wasted.

Figure 11B:
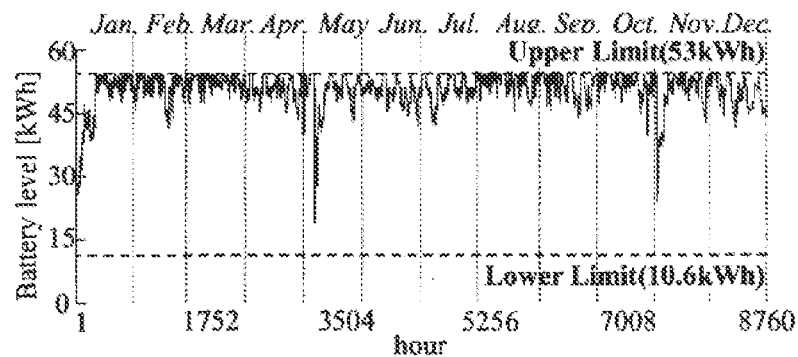
FIG. 11B is a graph illustrating a battery level at a time when a mobile storage battery is used for functions A and B.

When the mobile storage batteries were used for function A of driving the electric vehicles and function B of storing the surplus power of photovoltaic power generation, the mobile storage batteries remained substantially fully charged throughout the year as illustrated in FIG. 11B, and power was consumed rarely when the electric vehicles ran a long distance. In this case, power storage performance of the storage batteries was also wasted.

Figure 11C:
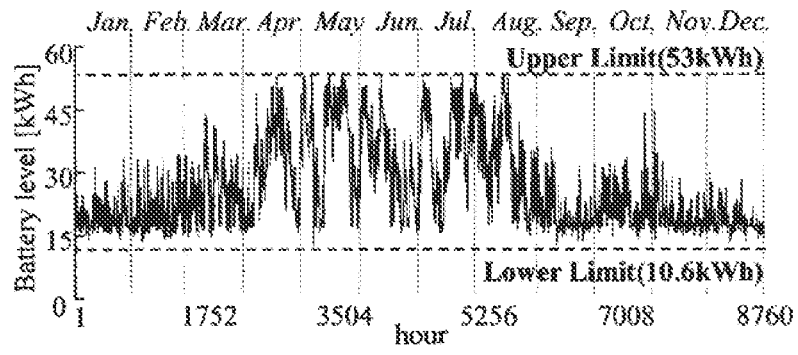
FIG. 11C is a graph illustrating a battery level at a time when a mobile storage battery is used for functions A, B, and C.

On the other hand, when the mobile storage batteries were also used for function C of, when power generated through photovoltaic power generation became insufficient for the power load, discharging power in addition to function A of driving the electric vehicles and function B of storing the surplus power of photovoltaic power generation, the remaining amount of power seldom reached the upper limit of the power storage capacity and significantly varied throughout the year as illustrated in FIG. 11C. This means that charge and discharge were efficiently performed within a range of the capacity of the storage batteries and the power storage performance of the storage batteries was effectively used. This is because empty capacity available for future charge was caused due to consumption of power in the driving and the discharge to the power load.

As described above, the energy system, where the mobile storage batteries have the three functions A, B, and C, is advantageous in that the surplus power is not wasted and the power storage performance of the storage batteries is fully utilized. A need for large stationary storage batteries, which have been considered essential for conventional energy systems provided with photovoltaic generators, therefore, can be reduced.

In the above example, a case has been described as an example where the mobile storage battery 25 of the commuter vehicle 21 is charged at the destination facility 10b and the mobile storage batteries 25 of the commuter vehicle 21 and the commonly used vehicle 22 are charged at the base facility 10a and discharged for the facility 10a. In addition, in the energy system 1 according to the present embodiment, an energy transfer method in which electric vehicles 20 transfer power to and from each other through a charge and discharge apparatus 38 can be used. When at least one of the two electric vehicles 20 that transfer power includes the charge and discharge apparatus 36, for example, one of mobile storage batteries 25 can discharge to charge another mobile storage battery 25 regardless of a place even at a destination distant from a facility 10 to which the two electric vehicles 20 belong. In this case, unit grids to which the electric vehicles 20 belong may be different from each other or the same.

When an electric vehicle 20 is a ferry and the ferry transports an automobile that is another electric vehicle 20, for example, power can be transferred between a mobile storage battery 25 of the ferry and a mobile storage battery 25 of the automobile. Alternatively, when an electric vehicle 20 is a train and the train transports a two-wheeled vehicle (a bicycle or a motorcycle) that is another electric vehicle 20, power can be transferred between a mobile storage battery of the train and a mobile storage battery of the two-wheeled vehicle. When a certain electric vehicle 20 transports another electric vehicle 20 like this, power can be transferred during transportation time. When an electric vehicle 20 is a large vehicle such as a ship, the electric vehicle 20 may include a photovoltaic generator 30 and a current conversion/adjustment apparatus 36. That is, in this case, the electric vehicle 20 also functions as a facility 10.

When electric vehicles 20 transfer power to each other through a current conversion/adjustment apparatus 36 like this, means for sharing power are diversified in a community employing the energy system 1. As a result, power generated in the community can be used more effectively, and the dependence upon the conventional electric power system can be further reduced.

Next, specific examples (first to third examples) of a heat storage and supply system that converts power into heat and stores the heat and that supplies heat to a heat load in a unit grid including a heat storage apparatus will be described. Heat storage and supply systems 61, 62, and 63 in the first to third examples, respectively, each include a heat conversion apparatus 41 and a heat storage tank 42 constituting the heat storage apparatus 40 and a floor heater 43 and a water heater 44 constituting a heat load 45. The water heater 44 is used for a bath, a lavatory, a sink in a kitchen, and the like.

Figure 12:
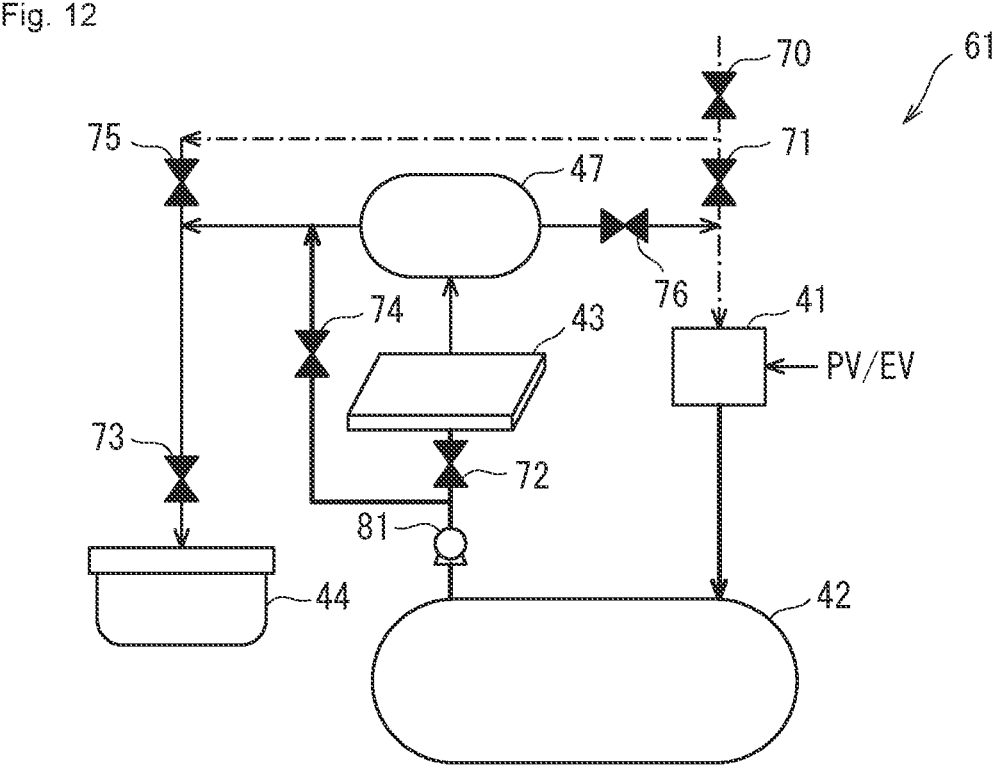
FIG. 12 is a configuration diagram in a first example of a heat storage and supply system.

As illustrated in FIG. 12, the heat storage and supply system 61 in the first example also includes a distribution tank 47 storing hot water. A water supply source supplies water to the heat conversion apparatus 41 through a water supply source valve 70 and a water supply valve 71. When power generated by a photovoltaic generator (PV) or power discharged from a mobile storage battery of an electric vehicle (EV) is supplied to the heat conversion apparatus 41 as a result of the control described above with reference to the flowcharts, water is heated by the operation of the heat conversion apparatus 41 (heat-up). The heated water is stored in the heat storage tank 42. A heat-up temperature is desirably higher than or equal to 80° C. and lower than 100° C., but here the heat-up temperature is set at 90° C. The heat storage tank 42 is, as described later, installed with improved thermal insulation.

When demand for the floor heater 43 arises, a water supply pump 81 operates to supply high-temperature hot water of 85° C. to 90° C. from the heat storage tank 42 to a pipe provided along a floor member through a floor heater valve 72. Hot water flowing through the pipe along the floor member warms a floor by exchanging heat with the floor member and air around the floor and is supplied to the distribution tank 47 as medium-temperature hot water of 45° C. to 60° C. The capacity of the distribution tank 47 may be set in accordance with the size of the floor heater 43 and the water heater 44 but is lower than that of the heat storage tank 42. The distribution tank 47 is also installed with improved thermal insulation as with the heat storage tank 42.

When demand arises in the water heater 44, the distribution tank 47 supplies hot water to the water heater 44 through a hot water supply valve 73. Hot water used in the water heater 44 need not have a high temperature as in the heat storage tank 42, and the medium-temperature hot water that has passed through the floor heater 43 will do. When heat demand in the water heater 44 exceeds heat demand in the floor heater 43, however, hot water supplied from the distribution tank 47 alone cannot satisfy the heat demand in the water heater 44, and high-temperature hot water pumped by the water supply pump 81 out of the heat storage tank 42 is supplied to the water heater 44 through a high-temperature valve 74. A temperature sensor (not illustrated) is provided upstream of the hot water supply valve 73, and when temperature of hot water is high, water supplied from the water supply source through the water supply source valve 70 is mixed with the hot water through a cooling valve 75, and the temperature of the hot water is adjusted to 42° C. to 43° C., which is suitable for hot water supply.

If medium-temperature hot water stored in the distribution tank 47 leaves a surplus, the surplus is supplied to the heat conversion apparatus 41 through a reheating valve 76 to heat hot water to be supplied to the heat storage tank 42. In doing so, heat used in the floor heater 43 can be effectively used, and power to be supplied to the heat conversion apparatus 41

Figure 13:
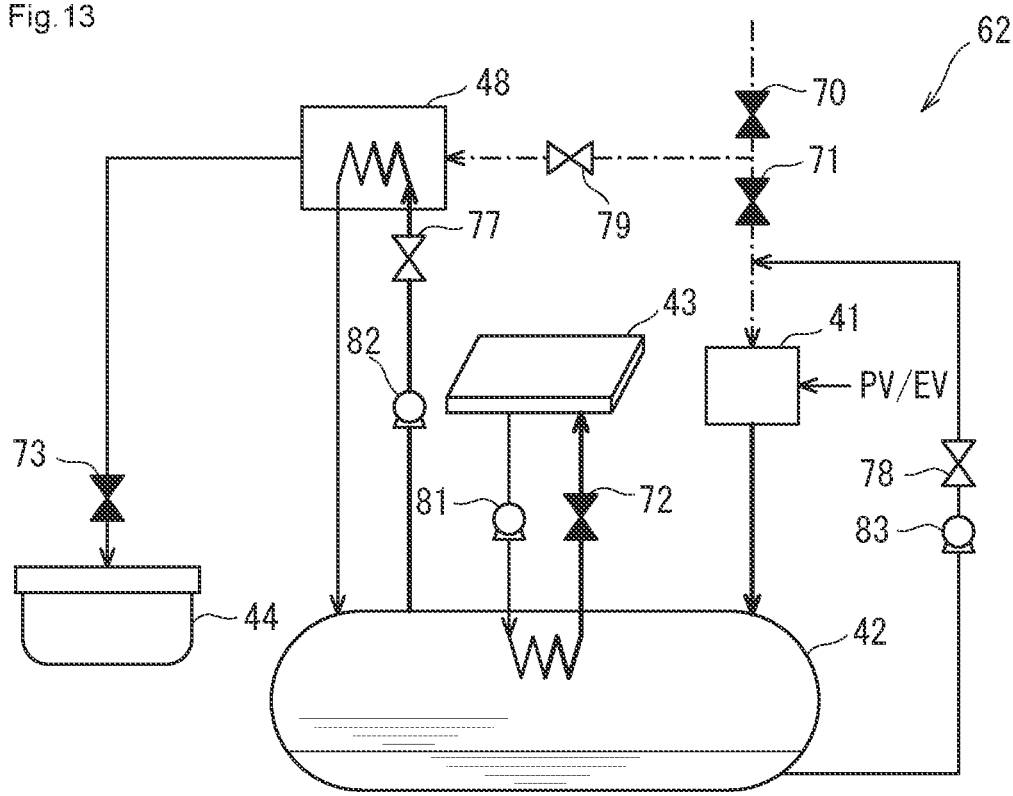
FIG. 13 is a configuration diagram in a second example of the heat storage and supply system.

Next, the heat storage and supply system 62 in the second example will be described with reference to FIG. 13. The heat storage and supply system 62 is the same as the heat storage and supply system 61 in that the water supply source supplies water to the heat conversion apparatus 41 through the water supply source valve 70 and the water supply valve 71 and hot water heated to 90° C. is stored in the heat storage tank 42. The heat storage and supply system 62 is different from the heat storage and supply system 61 in that, first, hot water pumped out of the heat storage tank 42 and used by the floor heater 43 is returned to the heat storage tank 42. Hot water pumped by the water supply pump 81 out of the heat storage tank 42 and supplied to the pipe provided along the floor member through the floor heater valve 72 is subjected to heat exchange, where the hot water is cooled to a medium temperature, and then returned to the heat storage tank 42.

The heat storage and supply system 62 is also different from the heat storage and supply system 61 in that hot water stored in the heat storage tank 42 is not directly supplied to the water heater 44 but used for heat exchange for giving heat to water to be supplied to the water heater 44. Water supplied from the water supply source to a heat exchange unit 48 through the water supply source valve 70 and a water supply control valve 79 is subjected to heat exchange with hot water pumped by a water supply pump 82 out of the heat storage tank 42 and supplied to the heat exchange unit 48 through a heating control valve 77, and the water heated to a medium temperature in the heat exchange unit 48 is supplied to the water heater 44 through the hot water supply valve 73. That is, hot water supplied to the water heater 44 is not the hot water stored in the heat storage tank 42 but clean water that has just been supplied from the water supply source and heated. The hot water used for the heat exchange in the heat exchange unit 48 is returned to the heat storage tank 42.

When the hot water that has been used in the heat exchange in the floor heater 43 and the heat exchange unit 48 and whose temperature has been decreased returns to the heat storage tank 42, the temperature of hot water stored in the heat storage tank 42 becomes lower than that of hot water stored in the heat storage tank 42 in the first example. When the temperature of hot water stored in the heat storage tank 42 becomes lower than a certain temperature (e.g., 65° C.), hot water is pumped by a water supply pump 83 out of the heat storage tank 42 to the heat conversion apparatus 41 through a reheating control valve 78 and heated by the heat conversion apparatus 41 to a high temperature of about 90° C. The hot water is then returned to the heat storage tank 42. In the heat storage and supply system in the second example, therefore, once the heat storage tank 42 becomes full as a result of supply of hot water obtained by heating water supplied from the water supply source using the heat conversion apparatus 41, new water or hot water is no longer supplied to the heat storage tank 42, and the hot water circulates through the floor heater 43, the heat exchange unit 48, and the heat conversion apparatus 41.

The heat storage and supply system 62 is more advantageous than the first example in that hot water supplied to the water heater 44 is clean, but since the temperature of hot water stored in the heat storage tank 42 is lower, the capacity (volume) of the heat storage tank 42 needs to be larger than that in the first example in order to compensate for the heat load.

can be reduced compared to when the heat conversion apparatus 41 heats only water supplied from the water supply source.

Figure 14:
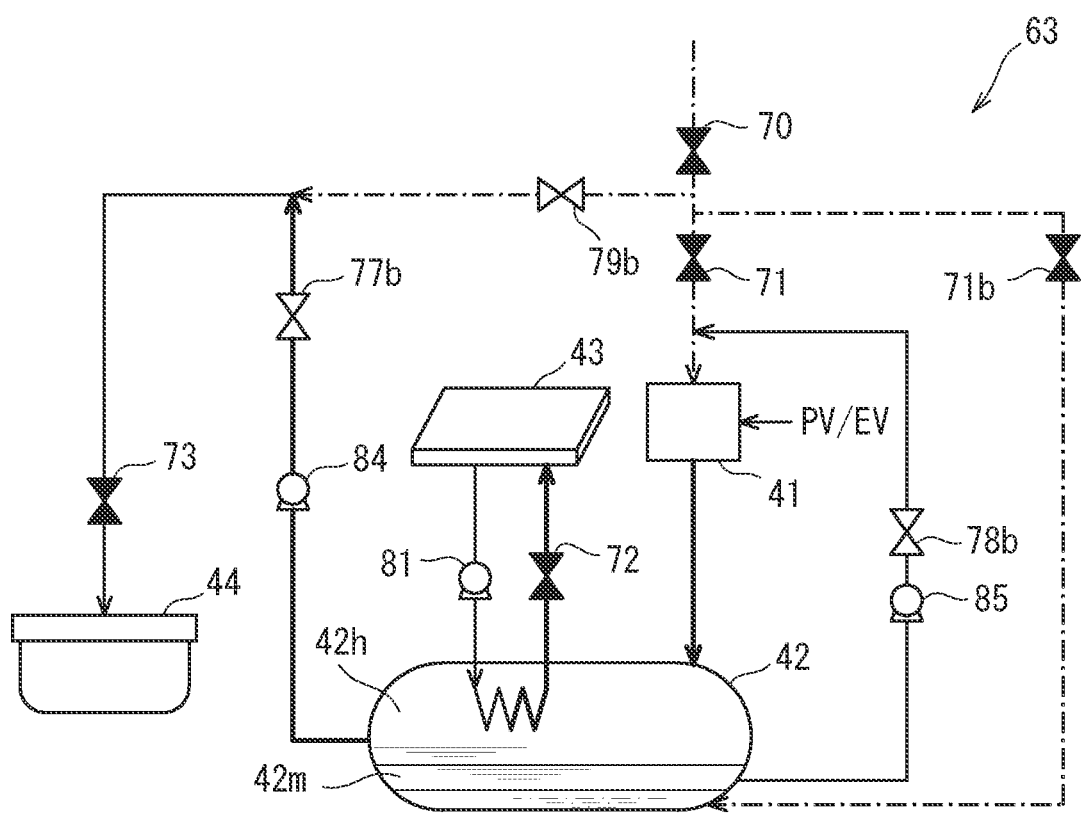
FIG. 14 is a configuration diagram in a third example of the heat storage and supply system.

Next, the heat storage and supply system 63 in the third example will be described with reference to FIG. 14. The heat storage and supply system 63 is the same as the heat storage and supply system 62 in the second example in that the water supply source supplies water to the heat conversion apparatus 41 through the water supply source valve 70 and the water supply valve 71 and hot water heated to 90° C. is stored in the heat storage tank 42 and in that hot water pumped out of the heat storage tank 42 and used by the floor heater 43 is returned to the heat storage tank 42. A difference is that water supplied from the water supply source through the water supply source valve 70 is supplied to a bottom of the heat storage tank 42 through a second water supply valve 71*b*. The heat storage tank 42 is provided with a mixing suppression mechanism, such as a mechanism employing an obstruction board, for preventing high-temperature hot water heated to 90° C. and supplied to the heat storage tank 42 and water supplied from the water supply source from mixing with each other.

When demand arises in the water heater 44, hot water stored in a high-temperature layer 42*h* of the heat storage tank 42 is pumped by a water supply pump 84 and supplied to the water heater 44 through a heating control valve 77*b* and the hot water supply valve 73. A channel from the heat storage tank 42 to the heating control valve 77*b* is provided with a temperature sensor (not illustrated), and if the temperature of hot water is higher than a certain temperature (e.g., 65° C.), the hot water is mixed with water supplied from the water supply source through the water supply source valve 70 and a water supply control valve 79*b* to adjust temperature of hot water to be supplied to the water heater 44 to 42° C. to 43° C.

Although the heat storage tank 42 is provided with the mixing suppression mechanism as described above, a medium-temperature layer 42*m*, where temperature of hot water is a medium temperature, is inevitably caused due to mixing of high-temperature hot water supplied from the heat conversion apparatus 41 and water supplied from the water supply source. The hot water in the medium-temperature layer 42*m* is pumped by a water supply pump 85 out of the heat storage tank 42 and supplied to the heat conversion apparatus 41 through a reheating control valve 78*b*. The hot water is then heated to 90° C. again and returned to the heat storage tank 42.

In the heat storage and supply system 63, only water supplied from the water supply source is newly introduced into the heat storage tank 42 to replace hot water supplied from the heat storage tank 42 to the water heater 44. A degree of freedom of a timing at which hot water is supplied from the heat storage tank 42 to the heat conversion apparatus 41 and reheated is high, and when there is a surplus power in the house, the heat conversion apparatus 41 can be operated using the surplus power, which is advantageous. In addition, the third example is the same as the first example in that hot water supplied to the water heater 44 is not water subjected to heat exchange but hot water supplied from the heat storage tank 42, but since the water supply source supplies water to the heat storage tank 42, the temperature of hot water in the high-temperature layer 42*h* is lower than that of hot water in the heat storage tank 42 in the first example. A need for, and a degree of, a decrease in the temperature of the hot water by mixing the hot water with water from the water supply source before supplying the hot water to the water heater 44, therefore, is lower than in the first example. That is, hot water can be supplied to the water heater 44 while using heat of the hot water stored in the heat storage tank 42 more efficiently than that in the first example. The capacity of the heat storage tank 42 in the third example, therefore, can be made smaller than that of the heat storage tank 42 in the first example, which is advantageous.

There is currently a hot water supply system that heats hot water at night using low-cost nighttime power, that stores the hot water in a tank, and that satisfies daytime demand using the hot water. In this conventional system, the tank is used to secure an amount required at a hot water supply facility such as a bath and supply a certain amount of hot water at once. Because the tank is supposed to store hot water only for a short period of time shorter than a day, not much consideration is given to thermal insulation. The heat storage tank 42 according to the present embodiment, on the other hand, is used to convert power into heat and store the heat in order to balance supply of power by a photovoltaic generator, with which the amount of power generated inevitably fluctuates depending on weather conditions, and energy demand. The heat storage tank 42, therefore, needs to store heat "for a long time" and is provided with a thermal insulation layer with significantly improved thermal insulation.

Figure 15A:
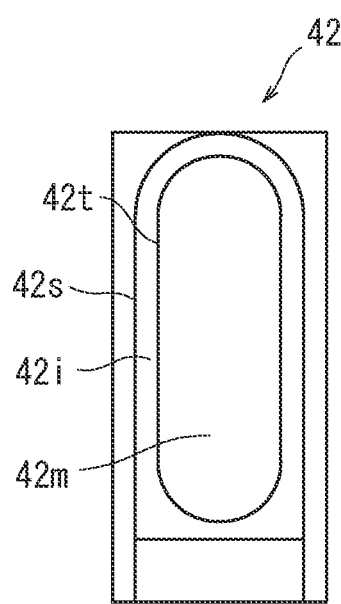
FIG. 15A is a configuration diagram of a heat storage tank including a thermal insulation layer.

The thermal insulation layer may be, as illustrated in FIG. 15A, a vacuum thermal insulation layer 42$i$, which has a double-wall structure composed of stainless steel or glass, where a wall of a container 42$t$ storing hot water, which is a heat medium 42M, is surrounded by another wall 42$s$ and a space between the two walls is a vacuum layer. A degree of vacuum may be $10^2$ Pa to $10^{-3}$ Pa. The vacuum layer can prevent transfer of heat by conduction, but an outer surface of an inner wall may be plated with silver or copper or affixed with copper or aluminum metal foil in order to suppress transfer of heat by radiation.

Figure 15B:
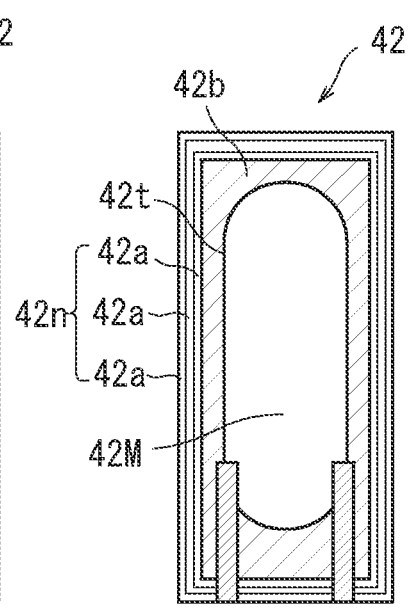
FIG. 15B is a configuration diagram of a heat storage tank including another thermal insulation layer.

Alternatively, as illustrated in FIG. 15B, a heat storage tank 42 may be used in which the entirety of a container 42$t$ is covered by a thermal insulation layer 42$n$ including a plurality of vacuum thermal insulation members 42$a$ stacked on one another. As the vacuum thermal insulation members 42$a$, a material obtained by covering a porous core material with a film and heat-sealing the film with an internal space of the film depressurized may be used. As the porous core material, an inorganic fiber such as glass fiber or ceramic fiber formed into a sheet may be used. As illustrated in the figure, a space caused between the thermal insulation layer 42$n$, in which the vacuum thermal insulation members 42$a$ are stacked on one another, and the container 42$t$ is desirably filled with an elastically deformable thermal insulation material 42$b$ such as polyurethane or glass fiber.

Figure 15C:
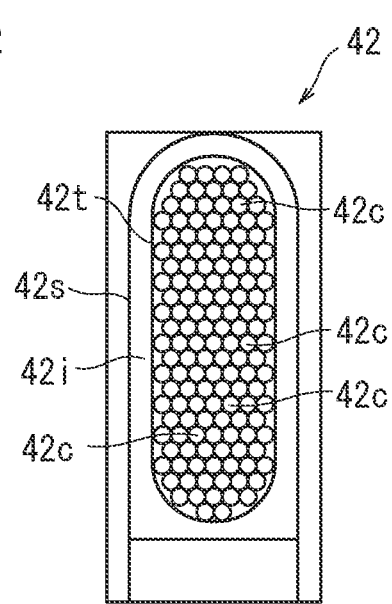
FIG. 15C is a configuration diagram of a heat storage tank in another mode.

Although the heat medium 42M is hot water in the above description, the heat medium may be a heat storage material composed of a ceramic, instead. FIG. 15C illustrates a heat storage tank 42 whose container 42$t$ is filled with a heat storage material 42$c$, which is balls composed of a ceramic such as alumina, as the heat medium. Although a highest temperature is 100° C. when hot water is used as the heat medium, heat can be stored with a high temperature of several hundred degrees when the heat storage material 42$c$ composed of a highly heat-resistant ceramic is used as the heat medium. In this case, the same amount of heat can be stored with a smaller heat storage tank than when hot water is used as the heat medium, and a larger amount of heat can be stored in a heat storage tank with the same volume than when hot water is used as the heat medium. Although FIG. 15C illustrates a case where a thermal insulation layer is the vacuum thermal insulation layer 42$i$ as in FIG. 15A, the configuration including the thermal insulation layer 42$n$ described with reference to FIG. 15B may be employed, instead.

Thermal insulation can be further improved by burying the heat storage tank 42 including the thermal insulation layer 42$i$ or 42$n$ in the ground. In addition, although FIGS. 15A to 15C illustrate a case where the heat storage tank 42 is vertically installed, the heat storage tank 42 may be horizontally installed, instead. In FIGS. 15A and 15B, components for supplying and discharging water, which is the heat medium 42M, to and from the container 42$t$ are not illustrated, and in FIG. 15C, components for supplying and discharging a fluid for exchanging heat with the heat storage material 42$c$ to and from the container 42$t$ are not illustrated.

Although cases where the same heat storage tank 42 supplies hot water to both the floor heater 43 and the water heater 44 have been described for the heat storage and supply systems 61, 62, and 63, different heat storage tanks may be used to supply the medium for heat demand for different purposes, such as heating and hot water supply, instead. Because different purposes require different temperatures and amounts, the configuration of a thermal insulation layer included in a heat storage tank and the capacity of the heat storage tank can be optimized by including different heat storage tanks. When hot water, which is a medium for storing heat, is supplied to a water heater, for example, a heat storage tank whose medium is hot water may be used. When heat is supplied for heat demand of hot water supply and heating through heat exchange with a medium for storing heat, a heat storage tank whose medium is a heat storage material composed of a ceramic capable of storing heat with a higher temperature may be used.

When a plurality of heat storage tanks are included in correspondence with heat demand for different purposes, the configuration of a unit grid can be simplified by sharing one heat conversion apparatus.

Figure 16A:
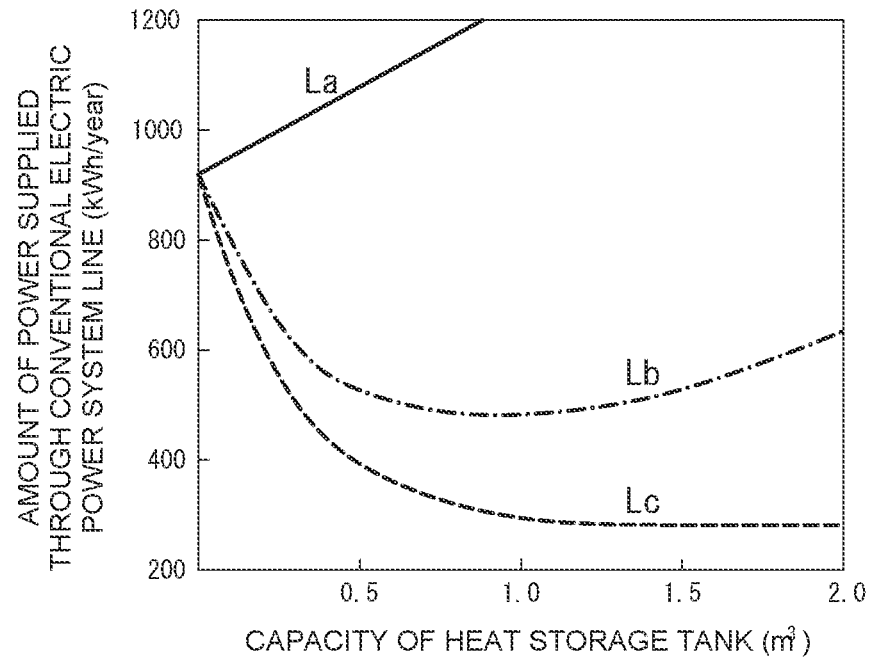
FIG. 16A illustrates a result of a simulation of a relationship between the capacity of a heat storage tank and the amount of power supplied through the conventional electric power system line at a time when heat demand is hot water.

As described above, in the energy system 1 according to the present embodiment, in which power generated by the photovoltaic generator can be supplied to the power load and a surplus power is stored in the mobile storage battery and the heat storage apparatus, the amount of power supplied through the conventional electric power system line can be further reduced by improving thermal insulation of the heat storage tank. This will be described using results of an examination where a heat transfer coefficient and the capacity of the heat storage tank are changed in the first unit grid, which is a general house, under the above-described conditions of the simulations on the energy balances. A case will be assumed where the coefficient of performance (COP) of the heat pump, which is a heat conversion apparatus, is 3 and hot water of 60° C. to 65° C. is stored in the heat storage tank for hot water supply. When only conventional electric power system is used to satisfy this heat demand and the heat transfer coefficient of the heat storage tank is 0.36 W/(m²·K), the amount of power supplied through the conventional electric power system line linearly increases as the capacity of the heat storage tank increases as indicated in FIG. 16A by a straight-line La. This is because the amount of heat radiated increases as the capacity of the heat storage tank increases.

On the other hand, with the energy system 1 according to the present embodiment that stores a surplus of power generated by the photovoltaic generator in the heat storage tank as heat, the amount of power supplied through the conventional electric power system line is significantly reduced when the capacity of the heat storage tank is about 0.5 m³ or larger as indicated by a curve Lb, even if the heat transfer coefficient of the heat storage tank is the same, 0.36 W/(m²·K). When the capacity of the heat storage tank exceeds about 0.9 m³, the amount of power supplied through the conventional electric power system line gradually increases but is significantly reduced compared to when only conventional electric power system is used. When the thermal insulation of the heat storage tank is further improved and the heat transfer coefficient becomes 0.06 W/(m²·K), the amount of power supplied through the conventional electric power system line is further reduced and when the capacity of the heat storage tank exceeds 1.2 m³, the amount of power supplied through the conventional electric power system line becomes constant and no longer increases as indicated by a curve Lc.

Figure 16B:
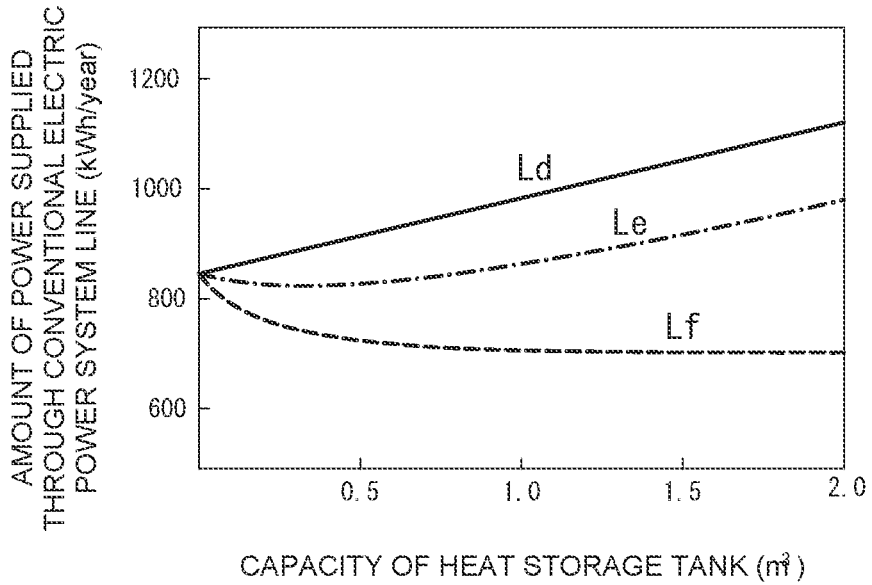
FIG. 16B illustrates a result of a simulation of a relationship between the capacity of the heat storage tank and the amount of power supplied through the conventional electric power system line at a time when the heat demand is heating.

Consider a case where hot water of 45° C. is stored in the heat storage tank for heating using a heat conversion apparatus having the same performance. When the heat transfer coefficient of the heat storage tank is 0.36 W/(m²·K) and only conventional electric power system is used to satisfy the heat demand, the amount of power supplied through the conventional electric power system line linearly increases as the capacity of the heat storage tank increases as indicated in FIG. 16B by a straight-line Ld as with the straight-line La in FIG. 16A, although a slope is different. In the energy system 1 according to the present embodiment, on the other hand, even when the heat transfer coefficient of the heat storage tank remains at 0.36 W/(m²·K), the amount of power supplied through the conventional electric power system line is significantly reduced with the capacity of the heat storage tank being about 0.5 m³ or larger as indicated by a curve Le. When the capacity of the heat storage tank exceeds about 0.4 m³, the amount of power supplied through the conventional electric power system line gradually increases but is significantly reduced compared to only conventional electric power system is used. When the thermal insulation of the heat storage tank is further improved and the heat transfer coefficient becomes 0.06 W/(m²·K), the amount of power supplied through the conventional electric power system line is further reduced and, when the capacity of the heat storage tank exceeds about 1.0 m³, the amount of power supplied through the conventional electric power system line becomes constant and no longer increases as indicated by a curve Lf.

It can be considered on the basis of these results of the above simulations that, with the energy system 1 according to the present embodiment in which the surplus power is supplied to the heat storage apparatus, an effect of reducing the amount of power supplied through the conventional electric power system line can be certainly produced at least when the heat transfer coefficient of the heat storage tank is within a range of 0.06 W/(m²·K) to 0.36 W/(m²·K) and the capacity of the heat storage tank is within a range of 0.5 m³ to 2.0 m³. The heat transfer coefficient within these numerical ranges can be achieved by including the vacuum thermal insulation layer 42i or 42n described with reference to FIGS. 15A to 15C in the heat storage tank.

As can be seen from FIG. 17 illustrating the amount of power generated by the photovoltaic generator and the amount of power supplied through the conventional electric power system line over a year in the first unit grid, which is a general house, the total amount of power consumed increases in summer and winter. This is because power consumption increases due to cooling in summer and heating in winter. Whereas most of the amount of power consumed in summer can be covered by photovoltaic power generation, the dependence upon the conventional electric power system increases in winter. The amount of power generated through the photovoltaic power generation inevitably fluctuates depending on the season. By using the heat storage tank with improved thermal insulation as described above, therefore, the surplus power generated through photovoltaic power generation from spring to summer can be converted into heat and stored in the heat storage apparatus and used for heat demand from fall to winter, when the amount of power generated through photovoltaic power generation decreases.

That is, in a unit grid including a photovoltaic generator, a surplus power generated in seasons (from spring to summer in Japan) when the amount of power generated by the photovoltaic generator becomes larger than power demand is converted into heat and stored in a heat storage apparatus, and the stored heat is supplied to a heat load in seasons (from fall to winter in Japan) when the amount of power generated by the photovoltaic generator decreases. This is a unique energy transfer adjustment method, in which power generated by a photovoltaic generator is converted into heat and stored and the stored heat is used for heat demand in a "long span across seasons". Such adjustment can be optimized, for example, by setting an output of the photovoltaic generator, thermal insulation (heat transfer coefficient) of a heat storage tank, and the capacity of the heat storage tank in consideration of power demand of a power load in a unit grid, heat demand of a heat load, and seasonal variation in a power balance of a mobile storage battery.

Figure 18:
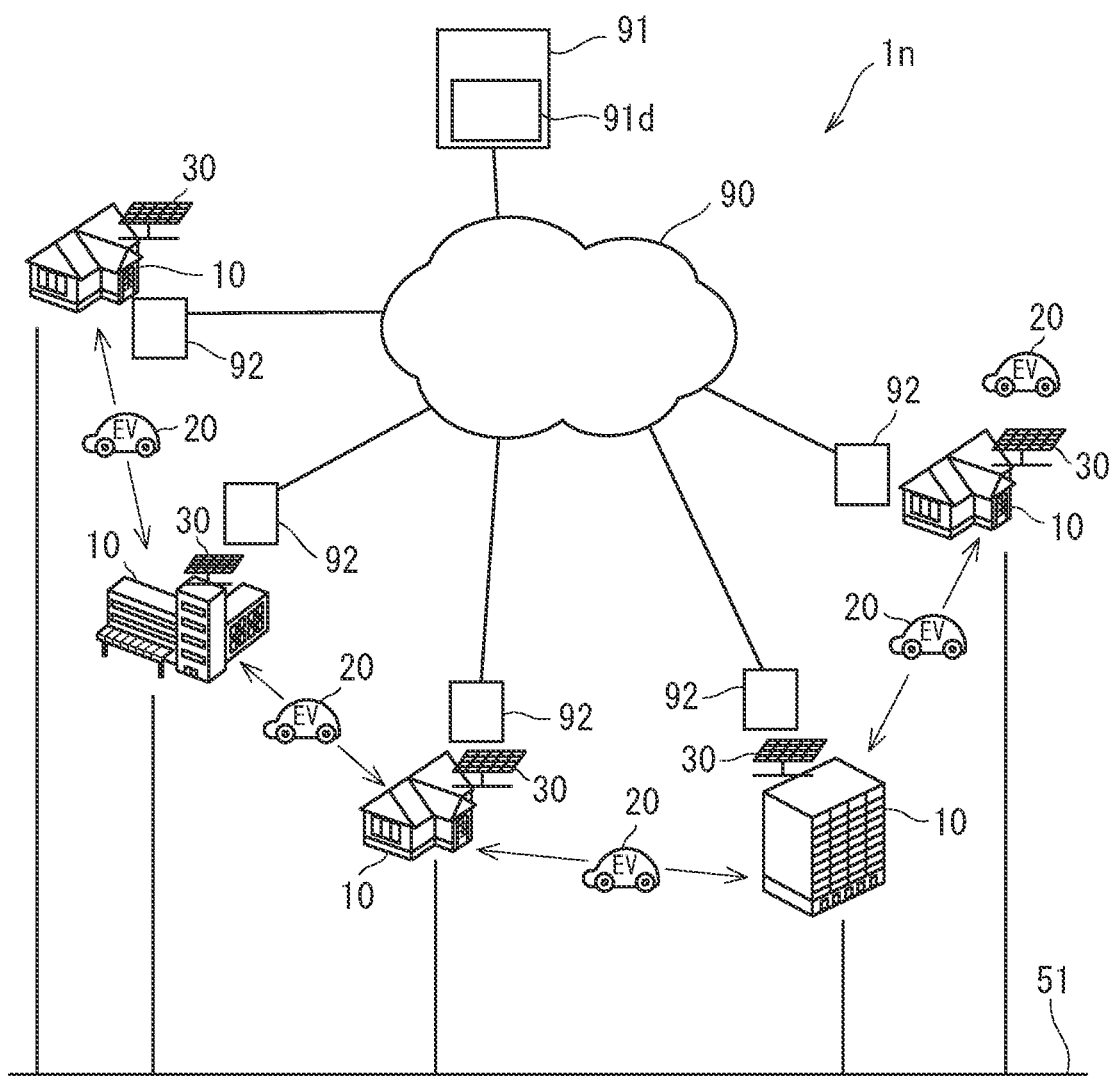
FIG. 18 is a diagram schematically illustrating a schematic configuration of an energy system in which cooperative grids are formed over a communication network.

The energy system 1 has been described above where a unit grid and another unit grid form a cooperative grid as electric vehicles move. Such an energy system 1 may be further developed to achieve an energy system 1n, where cooperative grids for unit grids to perform energy transfer adjustment can be formed over a communication network. As illustrated in FIG. 18, a management server 91 and user terminals 92 are connected to each other over a communication network 90 in the energy system 1n.

The user terminal 92 is achieved by further including a communication apparatus that communicates data over the communication network 90 in the above-described control apparatus included in a facility 10 or an electric vehicle 20 in a unit grid. The management server 91 is a server used by a business operator who manages the energy system 1n and is a computer including storage devices including a main storage device and an auxiliary storage device, a central processing unit, and a communication apparatus that communicates data over the communication network 90. The storage devices store a program for causing the computer to function as management energy transfer adjustment means.

The user terminal 92 transmits numerical data including the amount of power generated by the photovoltaic generator 30, the power demand of the power load, and the amount of power stored in the mobile storage battery in the unit grid to the management server 91 over the communication network 90. This numerical data is numerical data in a state where each unit grid forms a cooperative grid with another unit grid as at least one electric vehicle 20 moves and the above-described energy transfer adjustment is performed in the unit grid. The management server 91 stores the received numerical data in the storage devices as a database 91d while associating the numerical data with identification information regarding the unit grid.

Because weather conditions of geographically close areas are substantially the same, the amount of power generated by photovoltaic generators 30 in unit grids of facilities 10 located in the areas is substantially the same. As for consumption of power and heat, on the other hand, times when demand arises and the amount of consumption differ depending on lifestyles and the like of residents and users of the facilities 10. As for the mobile storage battery, too, movement distances and time periods when the electric vehicles 20 are used differ depending on purposes of use of the electric vehicles 20. Even in geographically close areas, therefore, energy balances and timings at which excesses and shortages occur are different between unit grids.

The management energy transfer adjustment means of the management server 91, therefore, monitors variation in numerical data transmitted from unit grids and calculates energy balances in order to detect a unit grid where power has left a surplus and a unit grid where a shortage has occurred. The management energy transfer adjustment means then makes arrangements to cause the unit grid with the surplus power to transmit power to the unit grid with the power shortage such that the amount of power supplied through the conventional electric power system line 51 to the unit grid with the power shortage becomes minimal. The transmission of power can be performed using equipment of the conventional electric power system line 51 on the basis of a contract between the manager of the energy system 1n and a business operator who owns and manages the conventional electric power system line 51.

By extracting a combination of unit grids that form cooperative grids such that the transfer of power between unit grids is performed between geographically close areas, power can be transmitted while suppressing a power loss. Since unit grids form cooperative grids over the communication network 90 and share power with each other, energy can be used efficiently in a community consisting of unit grids connected to the management server 91, and the amount of power supplied through the conventional electric power system line 51 can be reduced in each unit grid.

As described above, since a system where transportation of people and transportation of objects are integrated with transfer of energy is employed in the energy system and the energy transfer adjustment method according to the present embodiment, costs of the transfer of energy can be significantly reduced. In addition, since the mobile storage batteries that are originally intended for driving are also used to adjust energy transfer, the costs of the transfer of energy are also reduced in this respect.

Furthermore, since the dependence upon the conventional electric power system can be reduced by effectively using renewable energy and energy required in the entirety of the system can be reduced through appropriate energy transfer adjustment, a need for infrastructure including fossil fuel supply stations can be significantly reduced. Autonomous energy supply that does not depend on infrastructure, therefore, can be achieved, and energy can be stably supplied within a community even when lifelines are cut off due to a disaster or the like.

In addition, since an excellent effect of reducing $CO_2$ gas emissions can be produced, a load on an environment can be significantly reduced, and social demand for reducing greenhouse gas emissions can be met.

Furthermore, since an energy system where unit grids also form cooperative grids over a communication network is achieved, a unit grid with which excesses and shortages of power that cannot be adjusted within each unit grid. Therefore, a combination of unit grids, in which power is shared, can be selected more flexibly, and energy can be used more efficiently in the entirety of the community.

Although the present invention has been described with reference to a preferred embodiment, the present invention is not limited to the above embodiment. As described hereinafter, the above embodiment may be subjected to various improvements and design changes without deviating from the scope of the present invention.

Although a case where a renewable energy power generator is a photovoltaic generator has been described in the above embodiment, for example, the same energy transfer adjustment can be performed even with a power generator employing solar heat, wind power, terrestrial heat, or ocean energy. Processing for day and night differences and seasonal differences in the amount of power generated through photovoltaic power generation also applies to differences in the amount of power generated caused by natural conditions in other renewable energy power generators.

In addition, in an example of a cooperative grid consisting of the first unit grid and the second unit grid, electric vehicles and a heat storage apparatus belonging to the second unit grid, whose facility is a workplace, are not assumed. When the second unit grid has the same configuration as the first unit grid, however, the power-saving effect produced by the energy transfer adjustment can be further increased. That is, when every unit grid constituting a community includes not only a photovoltaic generator but also electric vehicles and a heat storage apparatus belonging to a facility of the unit grid, supplies power to mobile storage batteries of electric vehicles arriving from other unit grids, and performs energy transfer adjustment using electric vehicles and a heat storage apparatus therein, the power-saving effect in the entirety of the community can be further increased.

Furthermore, the number of unit grids with which a certain unit grid forms cooperative grids is not limited to one, and if the certain unit grid can form cooperative grids with yet another unit grid, the dependence upon the conventional electric power system can be further reduced in the entirety of the community, and $CO_2$ gas emissions can be reduced more significantly.

Alternatively, an energy system may be achieved where at least some of unit grids constituting a community include a hydrogen generator that decomposes water using power to produce hydrogen. In this case, when power generated by a renewable energy power generator leaves a surplus, the surplus can be converted into hydrogen and stored, and then used as a fuel. This is suitable for unit grids of facilities whose environments are suitable for storing hydrogen, such as chemical industrial facilities.

Although the floor heater 43 that distributes hot water into a pipe for heating has been described above as an example, a panel heater including a channel for hot water can be used, instead. Furthermore, a medium for transferring heat to a heater may be a medium itself storing heat in a heat storage tank or a fluid that has exchanged heat with the medium.

In addition, heating and hot water supply have been described in the above embodiment as an example of heat demand for which power is converted into heat and stored, and the stored heat is used. Instead of making a medium hot and storing heat, the medium may be cooled using power, stored, and used for cooling. When the medium is cooled and stored, too, a heat storage tank having the above configuration including a thermal insulation layer can be effectively used.

What is claimed is:

1. An energy system in a community provided with a plurality of unit grids,
   wherein each of the unit grids is an energy transfer network of a single-unit facility including a power load that consume power,
   wherein each of the unit grids include a renewable energy power generator that generates power using renewable energy and supply the power generated by the renewable energy power generator thereof to the power load thereof, wherein each of the unit grids forms, as an electric vehicle moves, a cooperative grid that transfers power stored in a mobile storage battery, which is a storage battery mounted on the electric vehicle, to and from another of the unit grids, wherein some of the unit grids whose geographical positional relationship is not fixed form a virtual grid for transferring power as a combination of the unit grids that form the cooperative grids changes in accordance with a destination of the electric vehicle, wherein the unit grid of which the facility is a general house further includes a heat load that consumes heat, a heat storage apparatus that converts the power into heat and stores the heat, an uninterruptible power supply that is a stationary storage battery in the facility, a control apparatus that performs energy transfer adjustment, wherein the control apparatus controls transfer of power through a current path for performing at least (A) supply of power to the power load from the renewable energy power generator, (B) supply of power to the heat storage apparatus from the renewable energy power generator, (C) supply of power to the mobile storage battery from the renewable energy power generator, or (D) supply of power to the uninterruptible power supply from the renewable energy power generator on a basis of detection of numerical data including an amount of power generated by the renewable energy power generator, power demand of the power load, heat demand of the heat load, an amount of heat stored in the heat storage apparatus, an amount of power stored in the mobile storage battery, and an amount of power stored in the uninterruptible power supply, and wherein the control apparatus controls such that (A) has the highest priority among (A) to (D), (D) has the lowest priority among (A) to (D), and the control apparatus does not control the supply of power from the uninterruptible power supply to the mobile storage battery.

2. The energy system according to claim 1, wherein the uninterruptible power supply is a small-capacity stationary storage battery of which an upper limit value of the amount of power stored is 5 kW.

3. The energy system according to claim 1,
wherein the control apparatus of each of the plurality of unit grids is connected to a management server over a communication network,
wherein each of the control apparatus transmits the numerical data to the management server over the communication network, and
wherein the management server is a computer that includes
a database that stores the received numerical data and identification information regarding the unit grid while associating the numerical data and the identification information with each other, and
the computer extracts a combination of the unit grids that form the cooperative grid for transferring power on a basis of an excess or a shortage of power in each of the unit grids.

4. The energy system according to claim 1,
wherein the heat storage apparatus includes a thermal insulation layer that thermally insulates a container storing a medium for storing heat, and wherein the thermal insulation layer is a vacuum thermal insulation layer in which a wall of the container has a double-wall structure and a space between two walls is a vacuum or a thermal insulation layer in which a plurality of vacuum thermal insulation members, each of which is obtained by covering a porous core material with a film and an internal space of the film is depressurized, are stacked on one another.

5. An energy transfer adjustment method used in an energy system in a community provided with a plurality of unit grids,
wherein each of the unit grids is an energy transfer network of a single-unit facility including a power load that consume power,
wherein, in the energy system,
each of the unit grids includes a renewable energy power generator that generates power using renewable energy and supply the power generated by the renewable energy power generator thereof to the power load thereof,
each of the unit grids forms, as an electric vehicle moves, a cooperative grid that transfers power stored in a mobile storage battery, which is a storage battery mounted on the electric vehicle, to and from another of the unit grids, and
some of the unit grids whose geographical positional relationship is not fixed form a virtual grid for transferring power as a combination of the unit grids that form the cooperative grids changes in accordance with a destination of the electric vehicle,
wherein the unit grid of which the facility is a general house further includes a heat load that consumes heat, a heat storage apparatus that converts the power into heat and stores the heat, an uninterruptible power supply that is a stationary storage battery in the facility, a control apparatus that performs energy transfer adjustment,
wherein the control apparatus controls transfer of power through a current path for performing at least (A) supply of power to the power load from the renewable energy power generator, (B) supply of power to the heat storage apparatus from the renewable energy power generator, (C) supply of power to the mobile storage battery from the renewable energy power generator, or (D) supply of power to the uninterruptible power supply from the renewable energy power generator on a basis of detection of numerical data including an amount of power generated by the renewable energy power generator, power demand of the power load, heat demand of the heat load, an amount of heat stored in the heat storage apparatus, an amount of power stored in the mobile storage battery, and an amount of power stored in the uninterruptible power supply, and
wherein the control apparatus controls such that (A) has the highest priority among (A) to (D), (D) has the lowest priority among (A) to (D), and the control apparatus does not control the supply of power from the uninterruptible power supply to the mobile storage battery.

6. The energy transfer adjustment method according to claim 5,
wherein a combination of a first unit grid whose facility is a general house and a second unit grid whose facility is a workplace of a resident of the house is included as the cooperative grid, wherein at least a commuter vehicle that belongs to the first unit grid and that is used for commuting is included as the electric vehicle, and wherein the commuter vehicle receives, when parked at the workplace, supply of power to the mobile storage battery from the renewable energy power generator of the second unit grid and, if power becomes insufficient for the power demand of the power load in the house when parked at the house, discharges from the mobile storage battery and supplies power to the power load.

7. The energy transfer adjustment method according to claim 5, wherein the renewable energy power generators of at least some of the unit grids constituting the community are photovoltaic generators, wherein the heat storage apparatus stores heat using the power supplied from the renewable energy power generator or the mobile storage battery and supplies the heat to the heat load, and wherein an energy transfer adjustment for a long span across seasons is performed, in the unit grid including the photovoltaic generator, such that a surplus power generated in seasons when the amount of power generated by the photovoltaic generator becomes larger than power demand is converted into heat and stored in the heat storage apparatus, and the stored heat is supplied to the heat load in seasons when the amount of power generated by the photovoltaic generator decreases.

8. The energy transfer adjustment method according to claim 5, wherein the electric vehicles belonging to the unit grids constituting the community transfer power to and from each other through a charge and discharge apparatus.

9. The energy transfer adjustment method according to claim 5, wherein each of the unit grids includes, as the current path, a conventional electric power system path for receiving supply of power through a conventional electric power system line or flowing power backwards to the conventional electric power system line, and wherein the control apparatus performs the control such that transfer of power through the conventional electric power system path becomes minimal.

10. The energy transfer adjustment method according to claim 5, wherein the control apparatus stores time-series actual values in a certain period in past as the numerical data and performs the control on a basis of the actual values and the numerical data at a present time.

11. The energy transfer adjustment method according to claim 5, wherein the control apparatus obtains weather forecast information over a communication network and performs the control while referring to the obtained weather forecast information.

12. The energy transfer adjustment method according to claim 5, wherein each of the control apparatuses of the plurality of unit grids is connected to a management server over a communication network, wherein the control apparatus transmits the numerical data to the management server over the communication network, and wherein the management server stores the received numerical data and identification information regarding the unit grid in a database while associating the numerical data and the identification information with each other, and extracts a combination of the unit grids that form the cooperative grid for transferring power on a basis of an excess or a shortage of power in each of the unit grids.

* * * * *